United States Patent
Watanabe

(10) Patent No.: US 8,350,826 B2
(45) Date of Patent: Jan. 8, 2013

(54) CAPACITIVE TOUCH PANEL DEVICE

(75) Inventor: Kiyoshi Watanabe, Arakawa-ku (JP)

(73) Assignee: Optrex Corporation, Tokyo (JP)

( * ) Notice: Subject to any disclaimer, the term of this patent is extended or adjusted under 35 U.S.C. 154(b) by 316 days.

(21) Appl. No.: 12/769,922

(22) Filed: Apr. 29, 2010

(65) Prior Publication Data

US 2010/0289769 A1    Nov. 18, 2010

(30) Foreign Application Priority Data

May 14, 2009 (JP) ................................. 2009-118060

(51) Int. Cl.
*G06F 3/045* (2006.01)

(52) U.S. Cl. ........................................ 345/174; 324/658

(58) Field of Classification Search .......... 345/173–178; 178/18.01–20.04; 324/658, 662
See application file for complete search history.

(56) References Cited

U.S. PATENT DOCUMENTS

| | | | | |
|---|---|---|---|---|
| 6,288,707 | B1 * | 9/2001 | Philipp | 345/168 |
| 7,692,638 | B2 * | 4/2010 | Land et al. | 345/173 |
| 7,982,723 | B2 * | 7/2011 | Ningrat | 345/174 |
| 2007/0229470 | A1 * | 10/2007 | Snyder et al. | 345/173 |
| 2009/0009194 | A1 * | 1/2009 | Seguine | 324/684 |
| 2009/0009195 | A1 * | 1/2009 | Seguine | 324/690 |
| 2010/0001966 | A1 * | 1/2010 | Lii et al. | 345/173 |
| 2010/0051354 | A1 * | 3/2010 | Ningrat et al. | 178/18.06 |
| 2010/0066701 | A1 * | 3/2010 | Ningrat | 345/174 |
| 2010/0282525 | A1 * | 11/2010 | Stewart | 178/18.06 |

FOREIGN PATENT DOCUMENTS

JP    2009-9249    1/2009

* cited by examiner

*Primary Examiner* — Alexander Eisen
*Assistant Examiner* — Sanjiv D Patel
(74) *Attorney, Agent, or Firm* — Oblon, Spivak, McClelland, Maier & Neustadt, L.L.P.

(57) ABSTRACT

Disclosed is a capacitive touch panel device having a sensing control unit that performs a scan sequence on individual sensor electrodes to measure sensor output values. The sensing control unit exercises control to measure sensor output values, with setup performed to avoid the detection of sensitivity slope, by executing a first scan sequence on all sensor electrodes. If the result of the first scan sequence indicates that multiple points are touched, the sensing control unit exercises control to measure sensor output values again, with setup performed to allow the detection of sensitivity slope, by executing a second scan sequence on the sensor electrodes related to a plurality of touch position candidate coordinates derived from multiple point touches, and identify and eliminate erroneously detected coordinates in accordance with the sensor output values measured upon the execution of the second scan sequence and with the tendency of sensitivity slope.

10 Claims, 20 Drawing Sheets

OUTPUT INFORMATION
· ZERO POTENTIAL DIFFERENCE
· NO CAPACITANCE CHANGE
· UNTOUCHED

CAPACITIVE TOUCH PANEL DEVICE

This application is based upon and claims the benefit of priority from Japanese Patent Application No. 2009-118060, filed on May 14, 2009, the disclosure of which is incorporated herein in its entirety by reference.

TECHNICAL FIELD

The present invention relates to a capacitive touch panel device.

BACKGROUND ART

There is a sensing method for use with a capacitive touch panel. This method uses each of a plurality of sensor electrodes patterned with ITO (Indium Tin Oxide) or other transparent electrodes as an independent sensor to capture and quantify capacitance changes. This method may be called a self-capacitance method or a single sensor method. Here, this method is referred to as a first method.

There is another sensing method for use with a capacitive touch panel. The functionality of this method is divided into two categories for quantification purposes: driving side and sensing side. The driving side charges and discharges capacitance generated between electrodes for driving purposes. The sensing side measures the resulting capacitance changes. This method may be called a mutual capacitance method. Here, this method is referred to as a second method.

When a multi-touch capability for simultaneously detecting two or more touch points is to be implemented for use with a touch panel based on the first method, the problem of ghost points arises so that detected coordinates do not always agree with actually touched points.

A capacitive touch panel capable of making multi-point entries is described, for instance, in Japanese Patent Application Publication JP-P2009-9249A. This touch panel is configured so that a plurality of two-dimensional capacitive sensors are positioned in close proximity to and parallel to each other.

A ghost phenomenon that may occur during the use of the first method can be avoided by determining which of two touch points was touched earlier, for instance, by using, instead of a touch panel control IC, an arithmetic processing unit that performs firmware-based computations or a control IC with a built-in microcomputer capable of performing arithmetic processing operations, and then eliminating ghost coordinates (erroneously detected coordinates) in accordance with the coordinates of the earlier-touched point.

However, the method of eliminating erroneously detected coordinates after determining which of two touch points was touched earlier successfully avoids a ghost phenomenon only when the time difference between two touches is longer than a scanning period for one sequence. Further, if any process needs to be performed by external firmware, another problem occurs to decrease the speed of processing and impose a load on an external device.

Furthermore, the touch panel described in JP-P2009-9249A accepts simultaneous multi-point entries in a limited area only.

Meanwhile, the second method makes it possible to avoid a ghost phenomenon that may arise from multi-touches. However, it is necessary to assign a control IC output to either the driving side or the sensing side. This causes a problem where the size and shape of applicable touch panels are limited or the scan rate is lower than when the first method is used.

FIG. 23 shows an example of an electrode pattern for a touch panel based on the first method. The example shown in FIG. 23 represents a pattern in which six electrodes are arranged in the x direction and five electrodes are arranged in the y direction. FIG. 24 is a diagram illustrating a capacitance measurement sequence of the touch panel shown in FIG. 23, which is based on the first method. As shown in FIG. 24, the first method, which measures the capacitance that is generated by a panel-mounted electrode and a finger, performs a line-sequential scan on all sensor terminals. FIG. 24 relates to a touch panel having an electrode pattern in which six electrodes are arranged in the x direction and five electrodes are arranged in the y direction, and indicates that the time required for one sequence is 11 T when the measurement time of each sensor is T.

Meanwhile, FIG. 25 shows an example of an electrode pattern for a touch panel based on the second method. The example shown in FIG. 25 represents a case where there are driving side terminals D1 to D6 and sensing side terminals S1 to S5. FIG. 26 is a diagram illustrating a capacitance measurement sequence of the touch panel shown in FIG. 25, which is based on the second method. As shown in FIG. 25, the second method, which measures the capacitance that is generated between two or more electrodes in the panel, performs a line-sequential scan on the sensing side with respect to a line-sequential drive of the driving side. FIG. 26 relates to a touch panel having driving side terminals D1 to D6 and sensing side terminals S1 to S5, and indicates that the time required for one sequence is 30 T. As described above, the second method requires a time of 30 T per sequence in marked contrast to the first method, which requires a time of as short as 11 T. It means that the use of the second method increases the response time.

SUMMARY

An exemplary object of the present invention is to provide a capacitive touch panel device that is capable of detecting multi-touches while minimizing the increase in the response time.

The capacitive touch panel device according to an exemplary aspect of the invention includes:

a capacitive touch panel which has sensor electrodes arranged in the x and y directions; and a sensing control unit (e.g. a sensing control unit 24) which controls the execution of a scan sequence to measure a sensor output value that is obtained by quantifying a change in the capacitance generated between the sensor electrode mounted in the capacitive touch panel and a conductive body (e.g. a finger) positioned close to the sensor electrode;

wherein, the sensing control unit exercises control to:

measure sensor output values, with setup performed to avoid the detection of sensitivity slope, by executing a first scan sequence (e.g. a normal scan sequence) on all the sensor electrodes mounted in the capacitive touch panel, if the result of the first scan sequence indicates that multiple points are touched, measure sensor output values again, with setup performed to allow the detection of sensitivity slope, by executing a second scan sequence (e.g. a ghost elimination sequence) on the sensor electrodes related to a plurality of touch position candidate coordinates derived from the multiple point touches, and identify and eliminate erroneously detected coordinates in accordance with the sensor output values measured upon the execution of the second scan sequence and with the tendency of sensitivity slope.

When multiple points are found to be touched, the sensing control unit may exercise control to perform setup to allow the detection of sensitivity slope, measure sensor output values again by executing the second scan sequence on the sensor electrodes that are arranged in the at least one of the x direction and the y direction, the sensor electrodes being found to be touched, and identify and eliminate erroneously detected coordinates in accordance with the magnitude relationship between the sensor output values of the sensor electrodes, which are measured upon the execution of the second scan sequence, and with the tendency of sensitivity slope.

When multiple points are found to be touched, the sensing control unit may exercise control to perform setup to allow the detection of sensitivity slope, measure sensor output values again by executing the second scan sequence on one or more sensor electrodes related to a plurality of touch position candidate coordinates derived from the multiple point touches, and identify and eliminate erroneously detected coordinates in accordance with the magnitude relationship between the sensor output values of the sensor electrodes, which are measured upon the execution of the second scan sequence, and position-specific expected sensor output values of a predetermined sensor electrode and with the tendency of sensitivity slope.

The capacitive touch panel device may include a switching circuit (e.g., a switching circuit group 21) is provided in a path connecting the sensor electrodes arranged in the at least one of the x direction and the y direction to a sensing circuit group for measuring sensor output values of destination sensor electrodes, the switching circuit being capable of switching between a route without internal resistance and a route with internal resistance;

wherein, when executing the first scan sequence, the sensing control unit performs setup to avoid the detection of sensitivity slope by causing the switching circuit to select the route without internal resistance; and wherein, when executing the second scan sequence, the sensing control unit performs setup to allow the detection of sensitivity slope by causing the switching circuit to select the route with internal resistance.

The capacitive touch panel device may include a current-limiting circuit (e.g., a power supply control unit 26) which limits the current flowing from a constant current source for applying a capacitance change to a sensor electrode;

wherein, when executing the first scan sequence, the sensing control unit performs setup to avoid the detection of sensitivity slope by exercising control to inhibit the current-limiting circuit from providing current control; and wherein, when executing the second scan sequence, the sensing control unit performs setup to allow the detection of sensitivity slope by exercising control to let the current-limiting circuit provide current control.

DESCRIPTION OF EXEMPLARY EMBODIMENT

Figure 1:
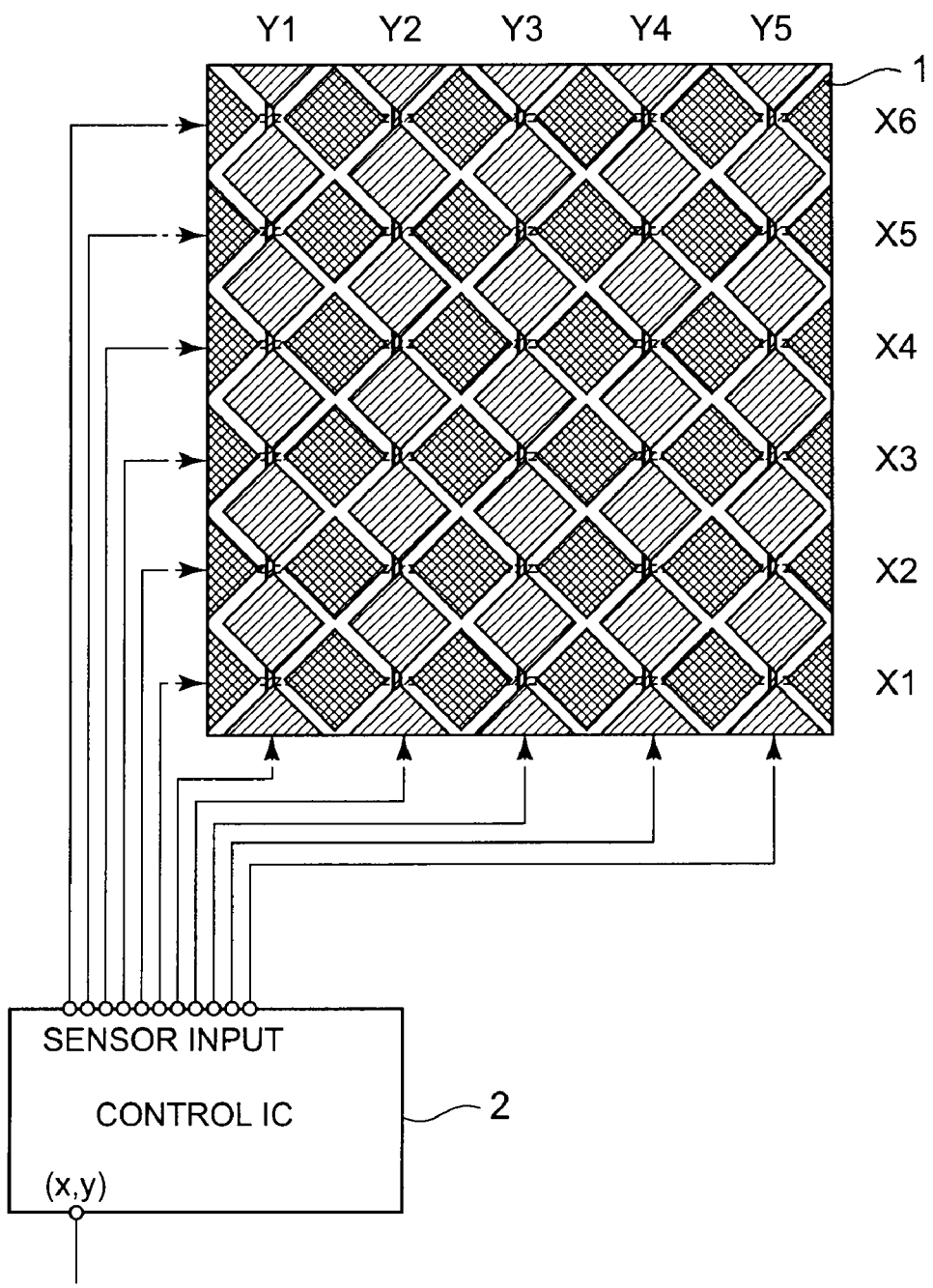
FIG. 1 is a diagram illustrating an example of a capacitive touch panel device according to an exemplary embodiment of the present invention.

An exemplary embodiment of the present invention will now be described with reference to the accompanying drawings. FIG. 1 is a diagram illustrating an example of a capacitive touch panel device according to the present invention. As shown in FIG. 1, the capacitive touch panel device includes a capacitive touch panel 1 and a control IC 2, which drives the touch panel 1.

The touch panel 1 is placed on a transparent substrate made, for instance, of glass or PET film in such a manner that ITO or other transparent electrodes do not overlap with each other. Areas in which sensor lines X1 to X6 extended in the x direction intersect sensor lines Y1 to Y5 extended in the y direction, which is different from the x direction, are provided, for instance, with an insulating layer (not shown) so that there is no conduction between the X1 to X6 sensor lines and Y1 to Y5 sensor lines. It is preferred that the areas of the intersections of the sensor lines be minimized.

FIG. 1 shows only a touch area as the touch panel 1. In reality, however, the outer frame of the touch panel is provided with wires connected to sensor terminals on a control IC 2. The control IC 2 uses the connected sensor terminals to repeatedly charge and discharge capacitance generated by a patterned sensor electrode and a conductive body (e.g., a finger) brought into contact with or positioned close to the sensor electrode, and determines a resulting capacitance change by making use, for instance, of a voltage developed upon charging at a predetermined time, a pulse count reached before charging, and the delay of CR oscillation.

The present invention basically uses the first method as the method of driving the capacitive touch panel. More specifically, the present invention uses the individual sensor electrodes as independent sensors, captures a capacitance change caused by a sensor line and a finger or other conductive body positioned close to a sensor, and quantifies the captured capacitance change to determine touch position coordinates. To achieve position coordinate resolution higher than that is provided by the number of sensors employed as the sensor electrodes, the control IC 2 may compare, divide, or perform other computations on the sensor output values of an electrode generating the greatest sensor output value and an electrode adjacent to such an electrode.

Figure 2:
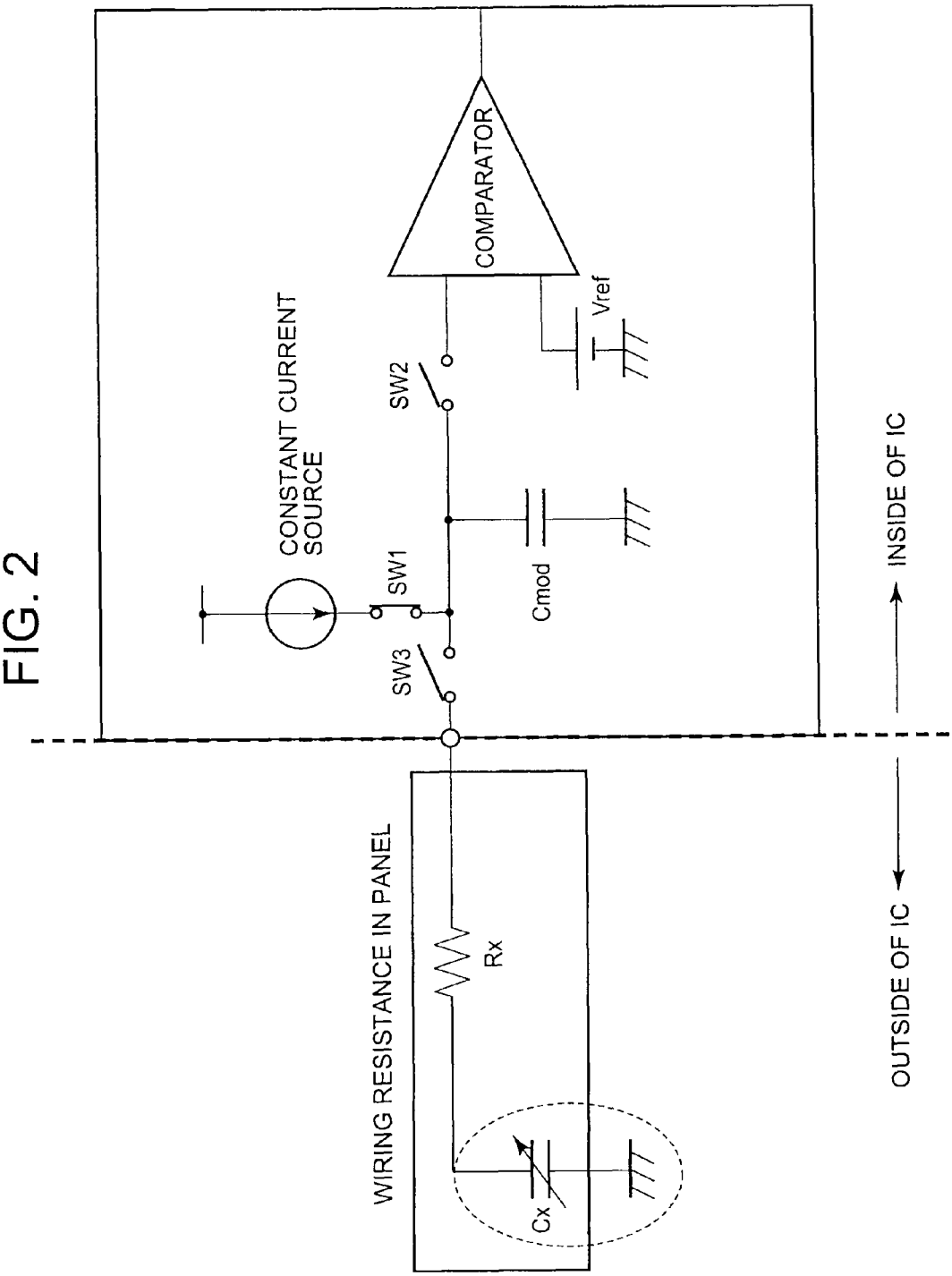
FIG. 2 is a simplified diagram of a circuit implementing a voltage-comparison (charge-comparison) sensing method.

FIGS. 2 to 4B are diagrams illustrating the sensing principle of the capacitive touch panel. FIG. 2 is a simplified diagram of a circuit implementing a voltage-comparison (charge-comparison) sensing method. It should be noted, however, that the sensing circuit and sensing method to be used are not limited to those indicated in the figure.

While the configuration shown in FIG. 2 is used, the symbol Cx denotes the capacitance generated by a finger and an ITO electrode (sensor electrode). The symbol Rx denotes the resistance of the wiring including the sensor electrodes in the touch panel. The resistance represented by the symbol Rx may be hereinafter referred to as the sensor electrode wiring resistance. The symbol Cmod denotes a voltage comparison capacitor. A comparator compares a voltage developed at one end of the capacitor Cmod, which is charged in a later-described measurement phase (phase 2), against a reference voltage Vref. It should be noted that the potential applied to the reference voltage Vref, which is to be input into the comparator, is equal to a voltage corresponding to a charge that can be stored in the capacitor Cmod in a later-described charging phase (phase 1). A constant current source causes a constant current to flow, thereby applying a capacitance change to the sensor electrodes. The symbol SW3 denotes a switch that turns on and off the connection between the sensor electrodes in the touch panel (hereinafter referred to as the panel) and a circuit in the control IC. The symbol SW2 denotes a switch that turns on and off the connection between the comparator and the capacitor Cmod. The symbol SW1 denotes a switch that turns on and off the connection between the constant current source and the sensor electrodes and capacitor Cmod. In other words, the sensor electrodes in the panel are connected to the constant current source through the switches SW3 and SW1 within the control IC. The constant current source is also connected to the capacitor Cmod through the switch SW1. The capacitor Cmod is connected to the comparator through the switch SW2.

Figure 3A:
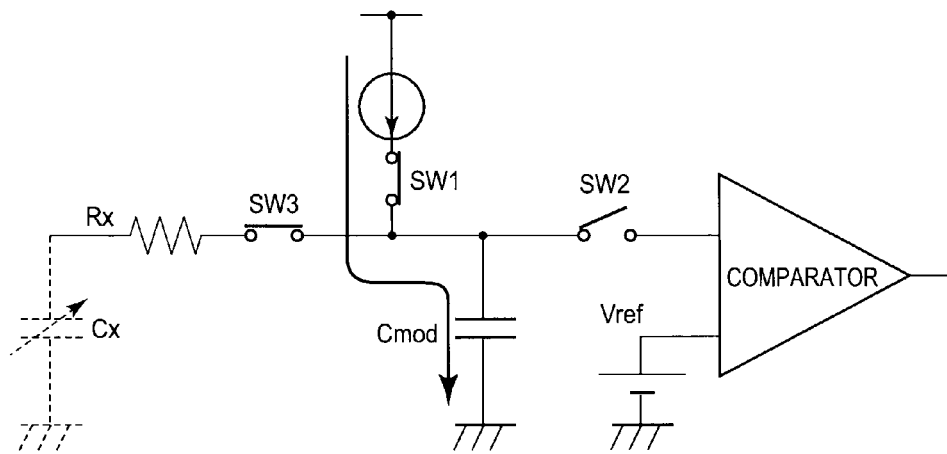
FIGS. 3A and 3B are diagrams showing examples of sensing in an untouched state when a voltage-comparison (charge-comparison) sensing method is used.
Figure 3B:
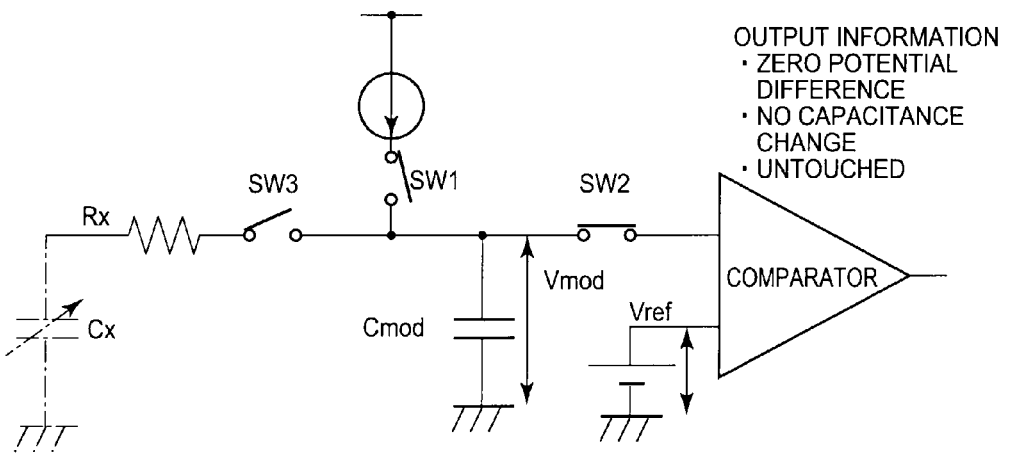

FIGS. 3A and 3B are diagrams showing examples of sensing in an untouched state when a voltage-comparison (charge-comparison) sensing method is used. FIG. 3A shows a typical circuit operation that is performed in the charging phase (phase 1) when the voltage-comparison (charge-comparison) sensing method is used. FIG. 3B shows a typical circuit operation that is performed in the measurement phase (phase 2) when the voltage-comparison (charge-comparison) sensing method is used.

In the charging phase (phase 1), for example, the control IC 2 changes the status of the switch SW1 from OFF to ON, the status of the switch SW2 from ON to OFF, and the status of the switch SW3 from OFF to ON as shown in FIG. 3A. The switches SW1 and SW3 stay ON for a definite period of time (charging period t1) so that the capacitor Cmod is charged with a charge flowing from the constant current source. In this instance, the capacitor Cx is not charged with a charge because no finger is in contact with the sensor electrodes in the panel.

When the charging period t1 elapses to initiate the measurement phase (phase 2), the control IC 2 changes the status of the switch SW1 from ON to OFF, the status of the switch SW2 from OFF to ON, and the status of the switch SW3 from ON to OFF as shown in FIG. 3B, and compares a voltage Vmod developed across the capacitor Cmod against a reference voltage Vref. Here, it is assumed that the potential applied to the reference voltage Vref is equal to a voltage that can be used to charge the capacitor Cmod during the charging period t1. In the present exemplary embodiment, the information output from the comparator indicates a potential difference of 0 (zero). As a result, the control IC 2 recognizes that no capacitance change is encountered, that is, the panel is not touched.

Figure 4A:
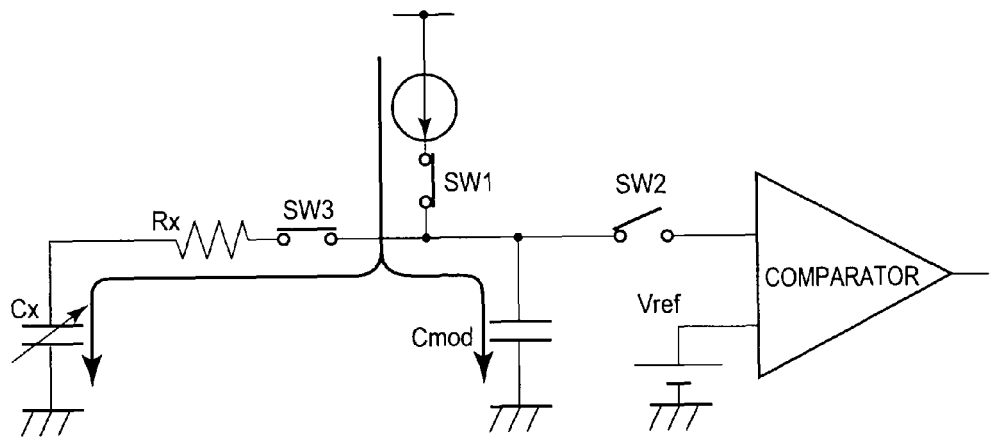
FIGS. 4A and 4B are diagrams showing examples of sensing in a touched state when a voltage-comparison (charge-comparison) sensing method is used.
Figure 4B:
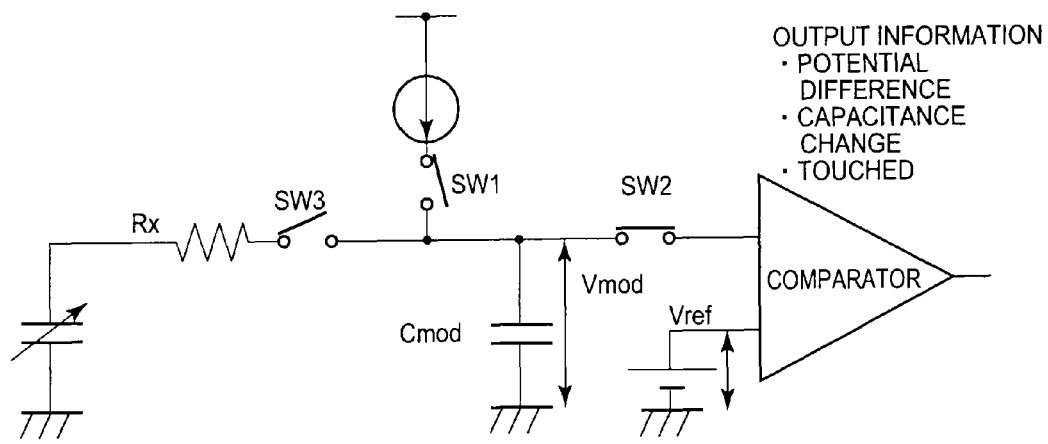

FIGS. 4A and 4B are diagrams showing examples of sensing in a touched state when the voltage-comparison (charge-comparison) sensing method is used. FIG. 4A shows a typical circuit operation that is performed in phase 1 (charging period) when the voltage-comparison (charge-comparison) sensing method is used. FIG. 4B shows a typical circuit operation that is performed in phase 2 (measurement period) when the voltage-comparison (charge-comparison) sensing method is used. In phase 1, the control IC 2 changes the status of the switch SW1 from OFF to ON, the status of the switch SW2 from ON to OFF, and the status of the switch SW3 from OFF to ON as shown in FIG. 4A, as is the case with the operation indicated in FIG. 3A. The switches SW1 and SW3 stay ON for the charging period t1 so that a current flows from the constant current source. However, as the touched state prevails in this instance, the current is distributed to the capacitors Cmod and Cx. As a result, the quantity of electric charge stored in the capacitor Cmod during the charging period t1 is smaller than in phase 1 indicated in FIG. 3A.

When the charging period t1 elapses to initiate phase 2, the control IC 2 changes the status of the switch SW1 from ON to OFF, the status of the switch SW2 from OFF to ON, and the status of the switch SW3 from ON to OFF as shown in FIG. 4B, as is the case with the operation indicated in FIG. 3B. The control IC 2 then compares a voltage Vmod developed across the capacitor Cmod against a reference voltage Vref. In this instance, the comparator outputs information indicative of a potential difference involved in the voltage distributed to the capacitor Cx. As a result, the control IC 2 recognizes that a capacitance change is encountered, that is, the panel is touched.

When the sensor output values of the sensor electrodes are to be calculated by using the sensor output values of the individual sensor electrodes (the sensor lines X1 to X6, Y1 to Y5 shown in FIG. 1) to raise the coordinate resolution, it is preferred that the sensor output values of all sensor electrodes be equal. In other words, the wiring of each sensor line should preferably be designed so that the same sensor output value is obtained no matter what sensor electrode in the touch panel is touched. More specifically, the wiring resistance Rx of each sensor electrode should preferably be reduced so that the capacitor Cx is sufficiently charged within the charging period t1. If any sensor output value variation is encountered, it can be suppressed by performing an averaging process or numerical correction process. It should be noted that the sensor output values represent the numerical expression of a capacitance change occurring in a sensor electrode.

Figure 5:
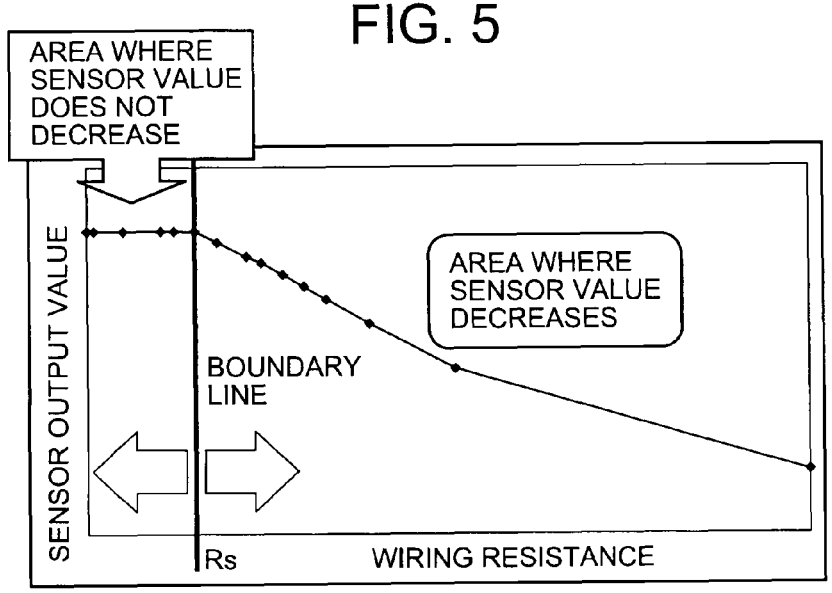
FIG. 5 is a diagram illustrating the relationship between the wiring resistance and sensor output value of a sensor electrode.

FIG. 5 shows the relationship between the wiring resistance and sensor output value of a sensor electrode. More specifically, FIG. 5 is a graph showing the result that was obtained when a sensor output value was measured while varying the resistance value of a resistor attached to an output terminal of the control IC as a pseudo-load. As is obvious from FIG. 5, the sensor output value begins to decrease when the wiring resistance is increased to a threshold value. To avoid a sensor output value variation in the touch panel, it is necessary to design the sensor electrode wiring so that the resistance is not greater than the threshold value (Rs).

Figure 6:
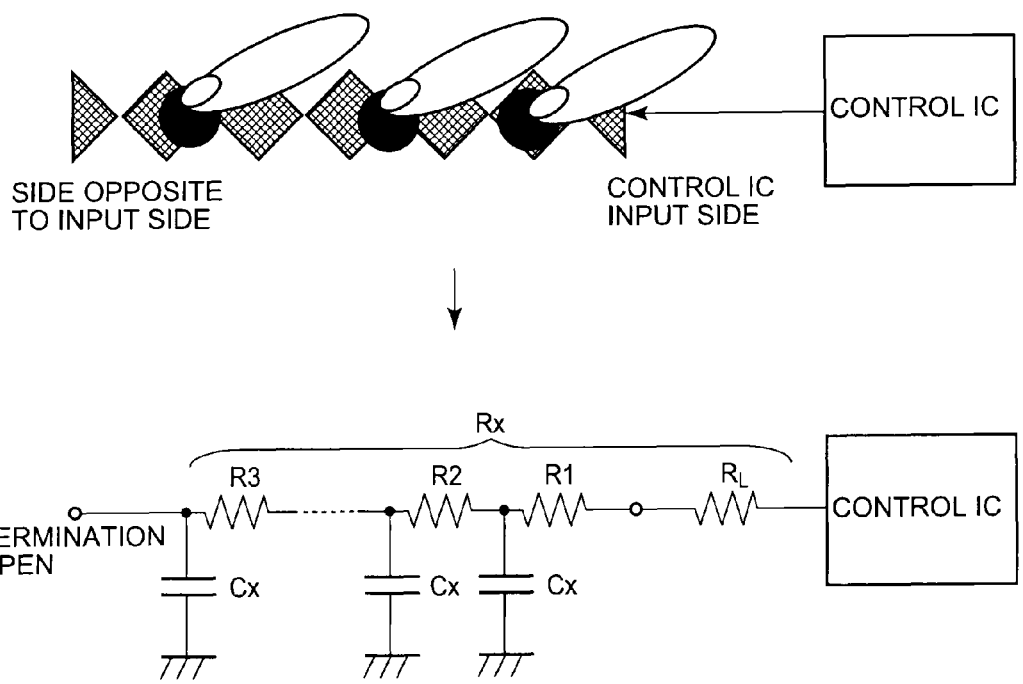
FIG. 6 is a diagram illustrating a typical touch-position-dependent wiring resistance value distribution.

Meanwhile, the wiring resistance Rx varies with the touched portion of a sensor electrode. FIG. 6 is a diagram illustrating a typical touch-position-dependent wiring resistance value distribution. In FIG. 6, the symbols R3, R2, and R1 represent a resistance value distribution that is generated from a reference position in proportion to the position of a sensor electrode. The symbol $R_L$ represents a wiring resistance value prevailing outside the touch area of the touch panel. As is obvious from FIG. 6, the resistance value generated before reaching the capacitor Cx varies depending on whether the touched portion is positioned toward a control IC input side or away from the control IC input side even when it is positioned on a single sensor line. Therefore, the total resistance value ($R3+R2+R1+R_L$) prevailing between a sensor electrode at the end of the sensor line (which is positioned opposite to input side) and a sensor terminal of the control IC needs to be not greater than the threshold value Rs, which is the upper-limit value that does not decrease the sensor output value.

Figure 7:
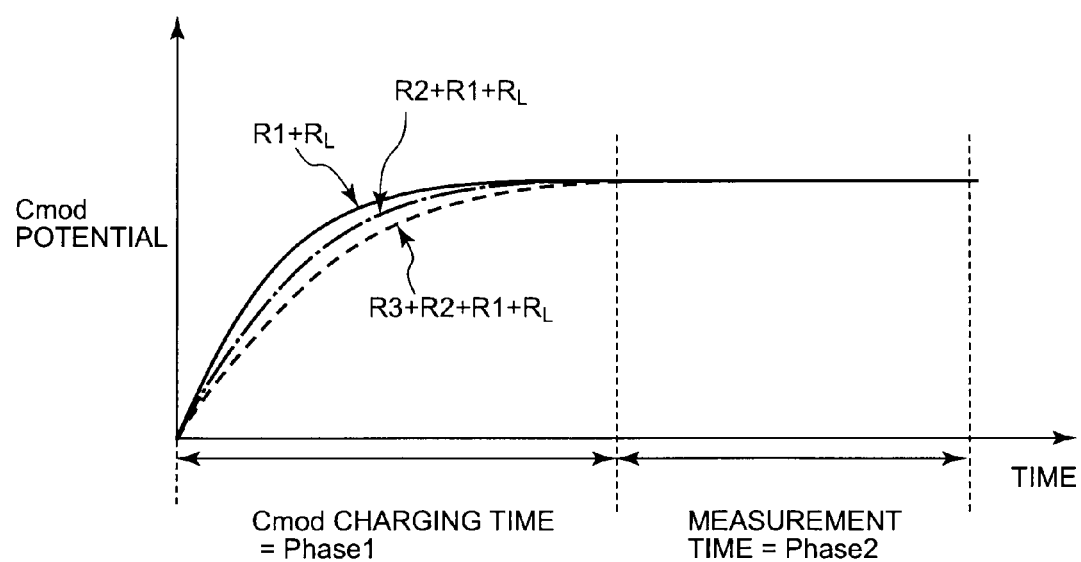
FIG. 7 is a diagram illustrating typical touch-position-dependent Cmod potential changes with time.

FIG. 7 is a diagram illustrating typical touch-position-dependent Cmod potential changes with time. The wiring resistance and Cmod charging period t1 need to be designed so that the potential of the capacitor Cmod charged during the charging period t1 remains the same as shown in FIG. 7 no matter whether the touched sensor electrode on the sensor line is positioned near the control IC input side (e.g., the "$R1+R_L$" line in FIG. 7) or away from the control IC input side (e.g., the "$R3+R2+R1+R_L$" line in FIG. 7).

Figure 8:
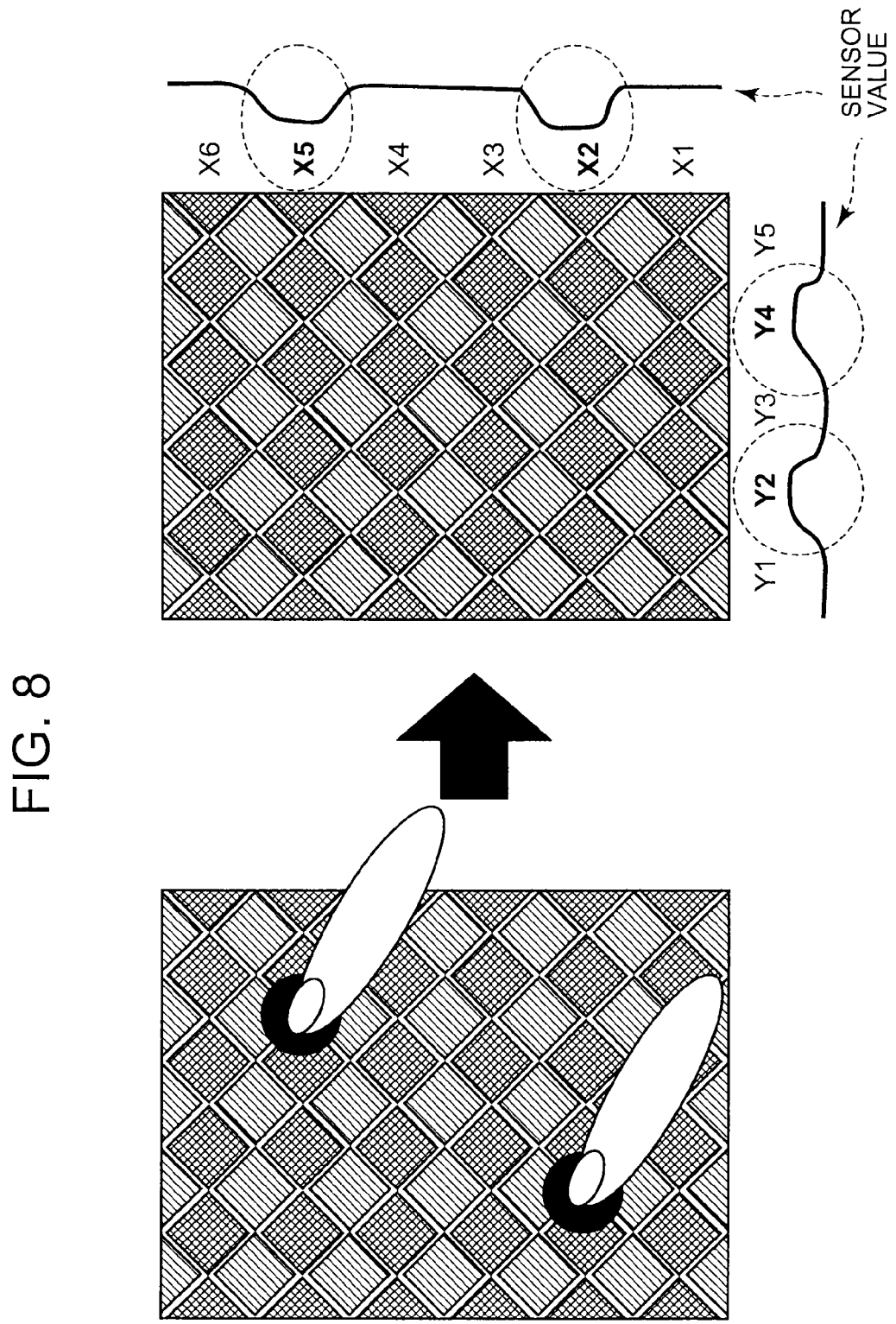
FIG. 8 is a diagram illustrating a ghost phenomenon that occurs during the use of the first method.
Figure 9:
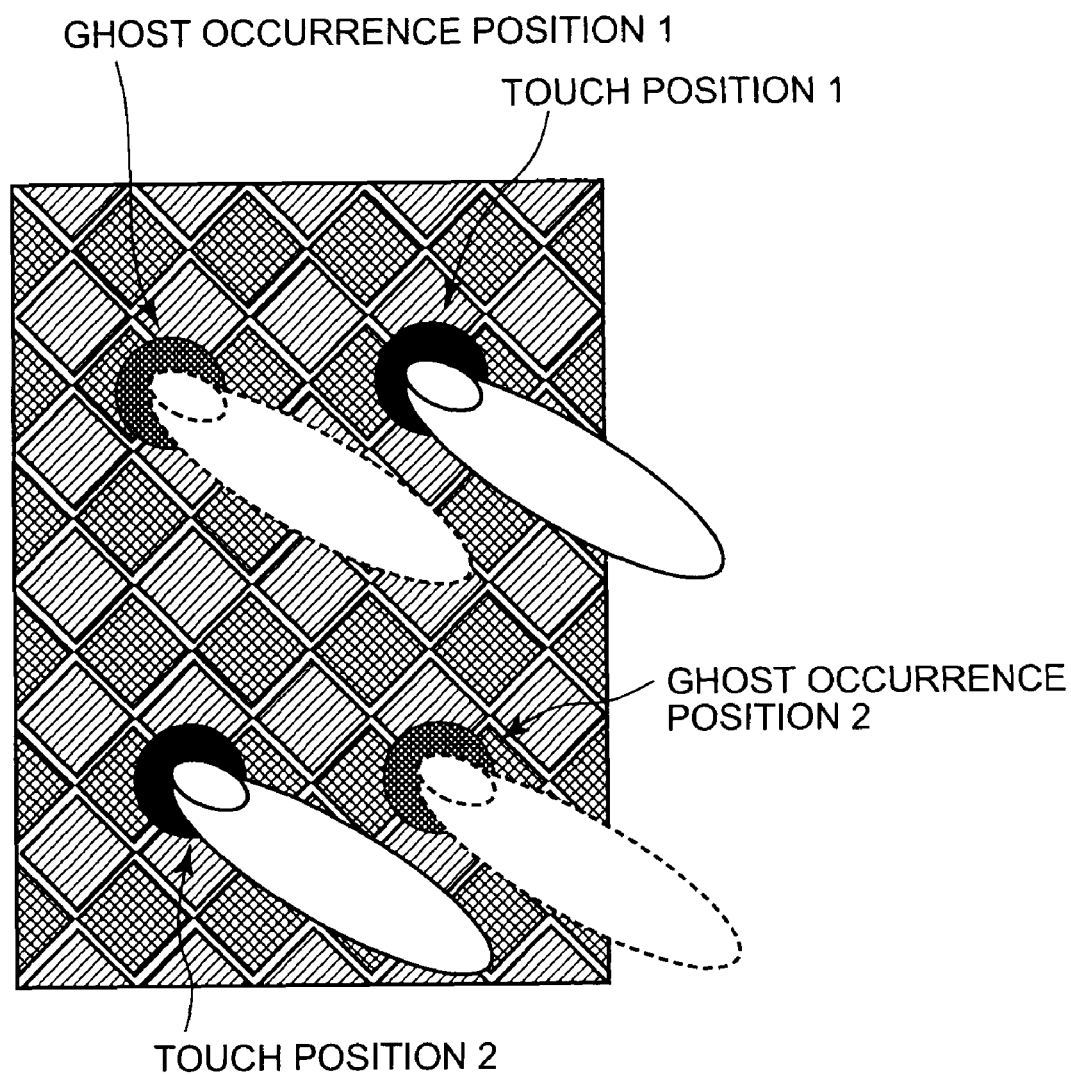
FIG. 9 is a diagram illustrating a ghost phenomenon that occurs during the use of the first method.

A method of driving the touch panel according to the present invention will now be described. FIGS. 8 and 9 are diagrams illustrating a ghost phenomenon that occurs during the use of the first method. When, for instance, a multi-touch operation is performed to touch two points on the touch panel formed by 6×5 sensor lines, the control IC 2 of the touch panel based on the first method measures the sensor output value of each sensor electrode, and then recognizes that four terminals (X2, X5, Y2, and Y4 in the example shown in FIG. 8) are active, as shown in FIG. 8. However, two patterns of touch positions theoretically exist in a situation where the four terminals are active. In the example shown in FIG. 9, there may exist two different combinations of touch positions: a combination of touch positions 1 and 2, which is a combination of primary touch positions, and a combination of ghost occurrence positions 1 and 2, which represent a ghost phenomenon. It is therefore necessary to judge which touch position combination is correct. However, such a judgment cannot be made simply by measuring the capacitance during a normal scan sequence. Consequently, when a plurality of possible touch positions are detected, the present invention additionally executes a ghost elimination sequence to eliminate erroneously detected coordinates, which represent a ghost phenomenon, and locate the primary touch positions.

It is assumed that the touch panel 1 according to the present exemplary embodiment is configured so that the resistance value Rx on each sensor line is smaller than the threshold resistance value Rs while the resistance values $R_L$ (the wiring resistance values prevailing outside the touch area) of all sensor lines are equal. The resistance values $R_L$ can be made equal, for instance, by making such a design as to use routing wires having the same length or by placing such a resistor between control IC sensor terminals and panel input terminals as to provide uniform wiring resistance.

Figure 10:
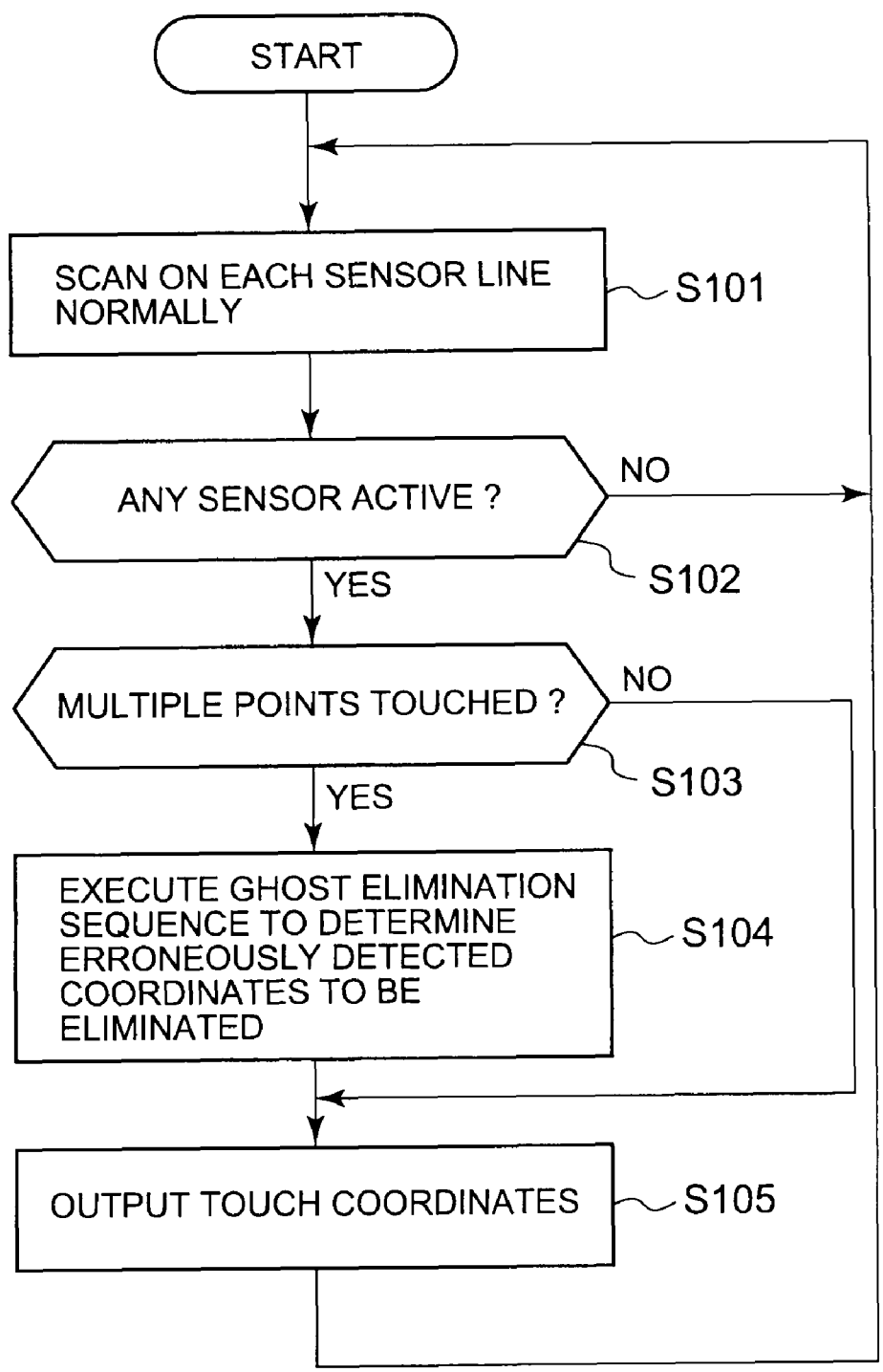
FIG. 10 is a flowchart illustrating a typical procedure for driving a touch panel.

FIG. 10 is a flowchart illustrating a typical procedure for driving the touch panel according to the present exemplary embodiment. As shown in FIG. 10, the control IC 2 first performs step S101 to scan on each sensor line normally. In step S101, a line-sequential scan is performed on all sensor terminals.

After each sensor line is scanned (to measure a capacitance change or detect a touch indicated by a capacitance change), the control IC 2 performs step S102 to judge whether any sensor line is active. If no sensor line is active, that is, if no capacitance change is detected at each sensor terminal (or if the detected capacitance change is not greater than an on/off judgment threshold value), the control IC 2 concludes that the panel is not touched at all, terminates a detection operation initiated by the present scan, and starts to perform the next scan (returns to step S101 as the query in step S102 is answered "No"). The control IC 2 then repeats the normal scan until it detects that the panel is touched.

If, on the other hand, any sensor line is active, that is, if a capacitance change indicative of a touch is detected at any sensor terminal (the query in step S102 is answered "Yes"), the control IC 2 proceeds to step S103 and checks for a combination of active sensor terminals to judge whether multiple points are touched. For example, the control IC 2 may judge whether four or more sensor lines are active. If four or more sensor lines are active, the control IC 2 may conclude that multiple points are touched.

If no multi-point touch is detected (the query in step S103 is answered "No"), the control IC 2 proceeds to step S105, merely outputs touch position coordinates, which are indicated by active sensor lines, and terminates a detection operation initiated by the present scan. Upon completion of step S105, the control IC 2 resumes the normal scan (returns to step S101).

If, on the other hand, a multi-point touch is detected (the query in step S103 is answered "Yes"), the control IC 2 proceeds to step S104, executes a ghost elimination sequence, and determines erroneously detected coordinates to be eliminated.

After the erroneously detected coordinates to be eliminated are determined, the control IC 2 proceeds to step S105, outputs position coordinates obtained upon the elimination of the erroneously detected coordinates as touch position coordinates, and terminates a detection operation initiated by the present scan. Upon completion of step S105, the control IC 2 resumes the normal scan (returns to step S101).

The ghost elimination sequence in step S104 will now be described in detail. It is assumed that the touch panel 1 according to the present exemplary embodiment generates the same sensor output value no matter what sensor electrode in the touch panel is touched. It is also assumed that the control IC 2 can selectively control each sensor electrode in such a manner that the obtained sensor output value varies depending on what portion of the sensor electrode is touched. In other words, it is assumed that the touch panel 1 is configured so that the control IC 2 can exercise internal control to switch from a state where Rx<Rs to a state where Rx>Rs.

In the ghost elimination sequence, erroneously detected coordinates are determined by setting the resistance of the at least one of an active X side sensor electrode and Y side sensor electrode so that Rx>Rs (that is, selecting a resistance value for detecting a sensitivity slope for a sensor line) and executing a scan again on the sensor line. Here, the term "sensitivity" represents the difference between a sensor output value generated in an untouched state and a sensor output value generated in a touched state. Detecting a sensitivity slope is to ensure that the detected sensitivity varies with the touch position on a sensor line, or more specifically, the distance between the touch position and an input terminal on the control IC. In other words, the detection of a sensitivity slope intentionally causes a sensitivity variation in the touch panel.

Figure 11:
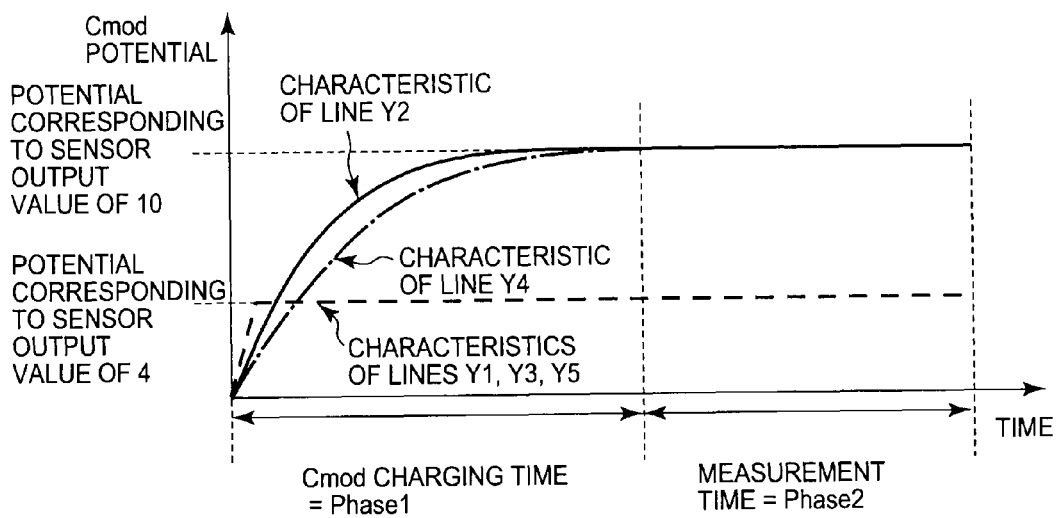
FIG. 11 is a diagram illustrating typical characteristics of Y2 and Y4 sensor lines that prevail during a normal scan sequence.
Figure 12:
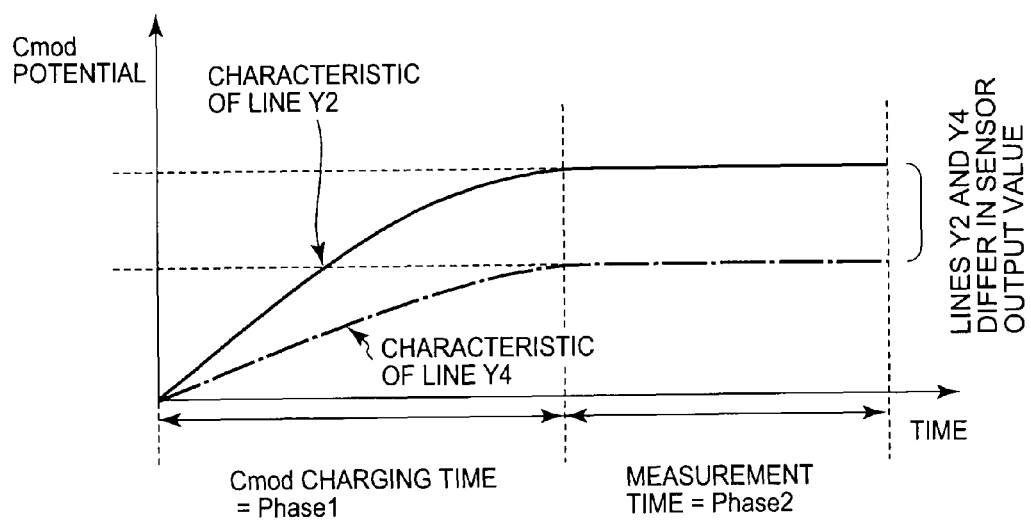
FIG. 12 is a diagram illustrating typical characteristics of Y2 and Y4 sensor lines that prevail during a ghost elimination sequence.

FIG. 11 is a diagram illustrating typical characteristics of Y2 and Y4 sensor lines that prevail while the normal scan sequence is performed in a touched state shown in FIG. 8. FIG. 12 is a diagram illustrating typical characteristics of Y2 and Y4 sensor lines that prevail while the ghost elimination sequence is performed in the touched state shown in FIG. 8. The example shown in FIG. 11 indicates that the Y2 and Y4 sensor lines are equal in the potential of the capacitor Cmod charged during the charging period t1 no matter whether the touch position is near or far from the control IC input side (the potential indicated in the example shown in FIG. 11 corresponds to a sensor output value of 10). As regards the other sensor lines Y1, Y3, Y5, which are not touched, the indicated Cmod potential corresponds to a sensor output value of 4. On the other hand, the example shown in FIG. 12 assumes that the total resistance value of all Y side sensor lines is expressed by the relational expression Rx>Rs. Therefore, the Y2 sensor line, which is touched at a position near the control IC input side, differs from the Y4 sensor line, which is touched at a position far from the control IC input side, in the potential of the capacitor Cmod charged during the charging period t1. It means that the Cmod potential varies depending on whether the touch position is near or far from the control IC input side. In other words, it can be judged that the touch point on the Y2 sensor line is near the control IC input side while the touch point on the Y4 sensor line is far from the control IC input side.

When, for instance, the sensor output value of the Y2 sensor line is 8 whereas the sensor output value of the Y4 sensor line is 5 in a situation where a scan has been performed with ghost elimination setup performed for each Y side sensor line so that Rx>Rs, the difference between these two sensor output values indicates which of the touch points on the Y2 and Y4 sensor lines is closer to the control IC input side.

When a multi-touch operation is performed, for instance, to touch two points, two different sets of coordinates, namely, correct coordinates and ghost coordinates caused by a ghost, are both detected as candidates. Therefore, a judgment should be made to determine which of the two different sets of touch point coordinates is correct. The judgment can be made, for instance, by determining the magnitude relationship between the sensor output values of two active sensor lines. This method can be used to judge that the touch point on the sensor line exhibiting a relatively great sensor output value is closer to the control IC input side, and then determine accordingly which set of coordinates is correct. In the present example, the Y2 sensor line sensor output value is greater than the Y4 sensor line sensor output value. It can therefore be judged in accordance with the tendency of a sensitivity slope that the touch position on the Y2 sensor line is closer to the control IC input side than the touch position on the Y4 sensor line. As a result, it can be concluded that the combination of ghost occurrence positions 1 and 2 should be handled as erroneously detected coordinates.

Figure 13:
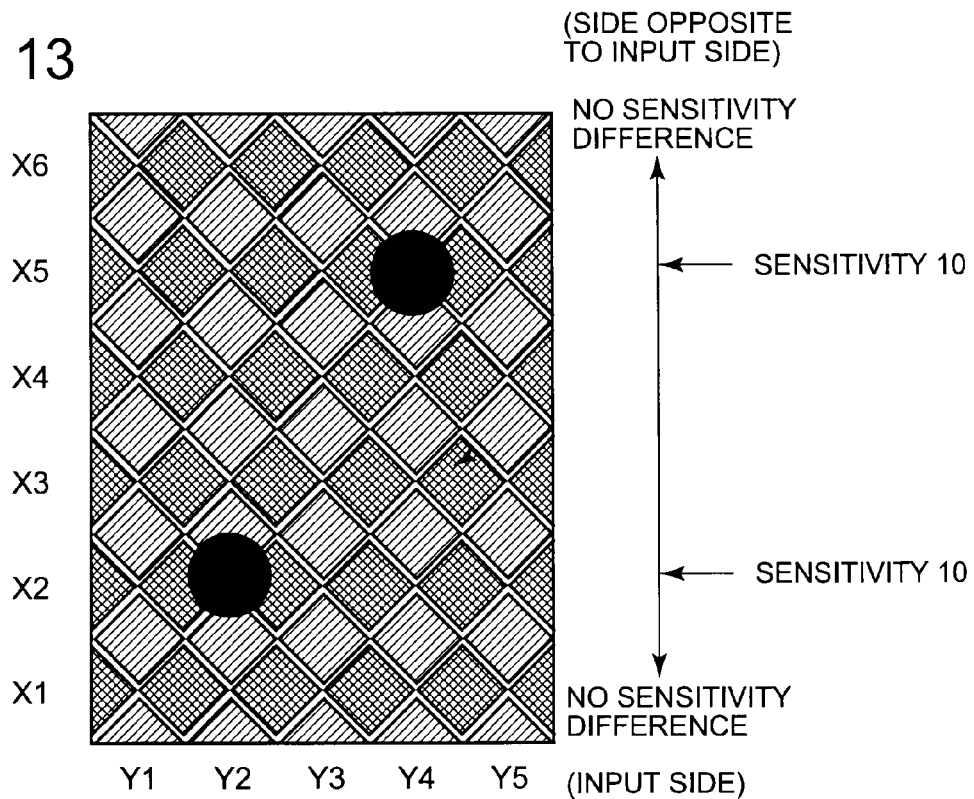
FIG. 13 is a diagram illustrating a typical sensitivity characteristic that prevails on a sensor line.
Figure 14:
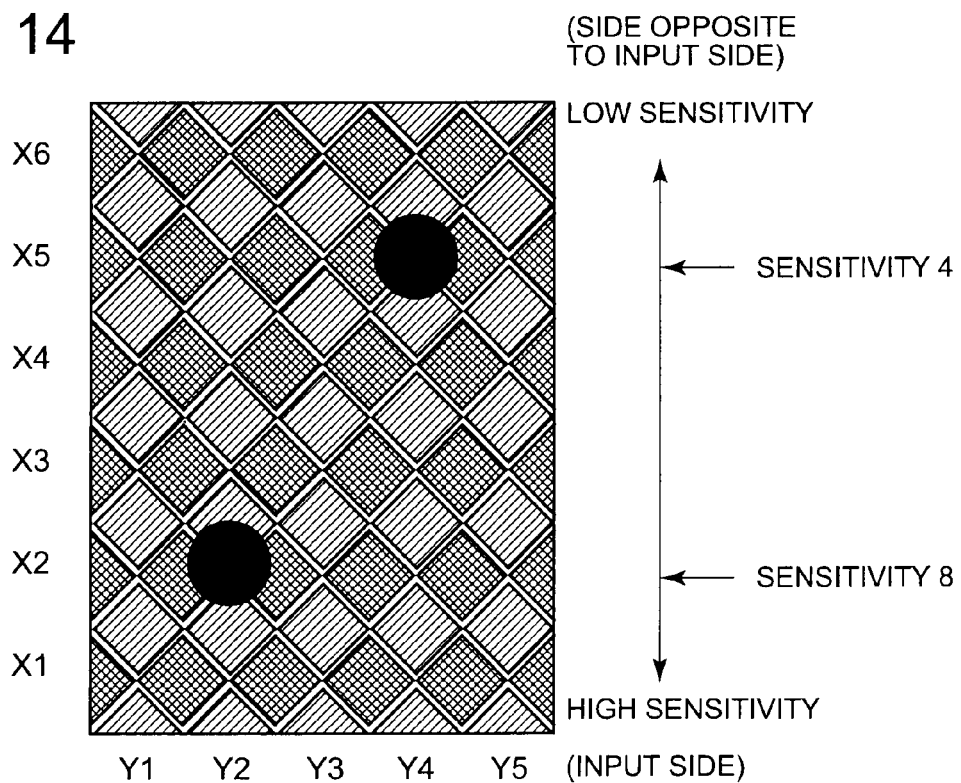
FIG. 14 is a diagram illustrating a typical sensitivity characteristic that prevails on a sensor line.

FIGS. 13 and 14 are diagrams illustrating a typical sensitivity characteristic that prevails on a sensor line. FIG. 13 is a diagram illustrating a typical sensitivity characteristic that prevails on a Y side sensor line while the normal scan sequence is performed in the touched state shown in FIG. 8. FIG. 14 is a diagram illustrating a typical sensitivity characteristic that prevails on a Y side sensor line while the ghost elimination sequence is performed in the touched state shown in FIG. 8. During the normal scan sequence, a scan is performed with the sensitivity characteristic set up so that sensitivity does not vary with the touch position on a sensor line as shown in FIG. 13. During the ghost elimination sequence, on the other hand, a scan is performed with the sensitivity characteristic changed to generate a sensitivity slope so that sensitivity varies with the touch position on a sensor line as shown in FIG. 14.

When a sensing operation is to be performed before executing the ghost elimination sequence (a scanning operation is to be performed in step S101), sensor lines other than the Y2 and Y4 sensor lines, which are inactive, may be excluded from a list of sensing targets. Another alternative is to measure the sensor output values of such sensor lines without excluding them from the list of sensing targets and then discard the measured values. In the present exemplary embodiment, the sensing operation to be performed before executing the ghost elimination sequence is performed on either the X side or Y side active sensor lines for ghost elimination purposes. Either the X side or Y side sensor lines may be preselected as the targets on which the ghost elimination sequence will be performed. For example, the ghost elimination sequence may be performed on the X side sensor lines or Y side sensor lines, whichever smaller in number.

If each of the Y1 to Y5 sensor lines is to be sensed during the ghost elimination sequence, a predefined scan sequence can always be performed without regard to the touch position. This eliminates the necessity of forming a control circuit for selecting individual sensor lines, thereby reducing the load on the control IC.

Another judgment method is to make a judgment by determining, for instance, the magnitude relationship between a position-specific expected sensor output value, which is a sensor output value predetermined in association with a touch position on a sensor line, and an actual sensor output value. When this method is used, a touch position roughly determined from the comparison between the position-specific expected sensor output value and the actual sensor output value should be considered to decide which candidate coordinates of an actual touch position on the sensor line are correct. If, for instance, the position-specific expected sensor output value predetermined in association with a central position of a sensor line is 6 and the Y2 sensor line sensor output value prevailing during the ghost elimination sequence is 8, it can be concluded in accordance with the magnitude relationship and the tendency of a sensitivity slope that the actual touch position is between the center and a side opposite to input side. If the position-specific expected sensor output value is predetermined with higher precision, the actual touch position can be determined with higher resolution. In the present example, the combination of ghost occurrence positions 1 and 2 in the example shown in FIG. 9 can be identified as erroneously detected coordinates simply by sensing either the Y2 sensor line or Y4 sensor line in the ghost elimination sequence. If a predefined scan sequence is to be performed in this case as well, detected values derived from the sensing of the other sensor lines can be discarded.

Figure 15:
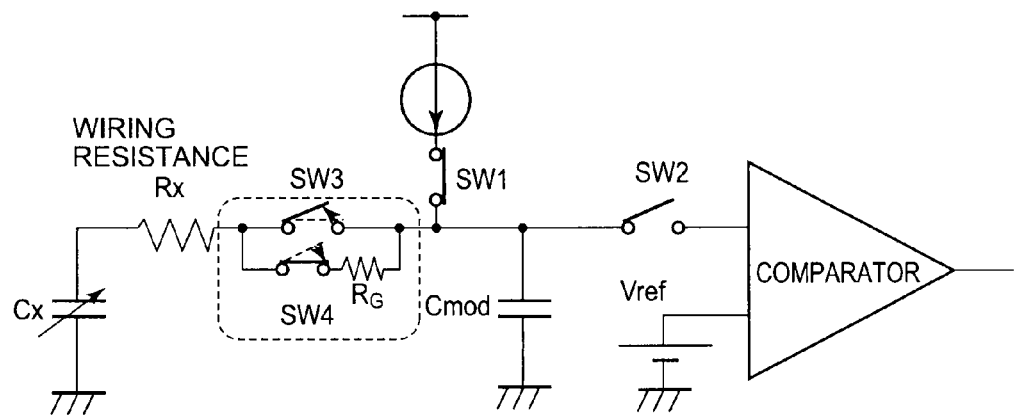
FIG. 15 is a schematic diagram illustrating a typical circuit configuration of a control IC 2.
Figure 16:
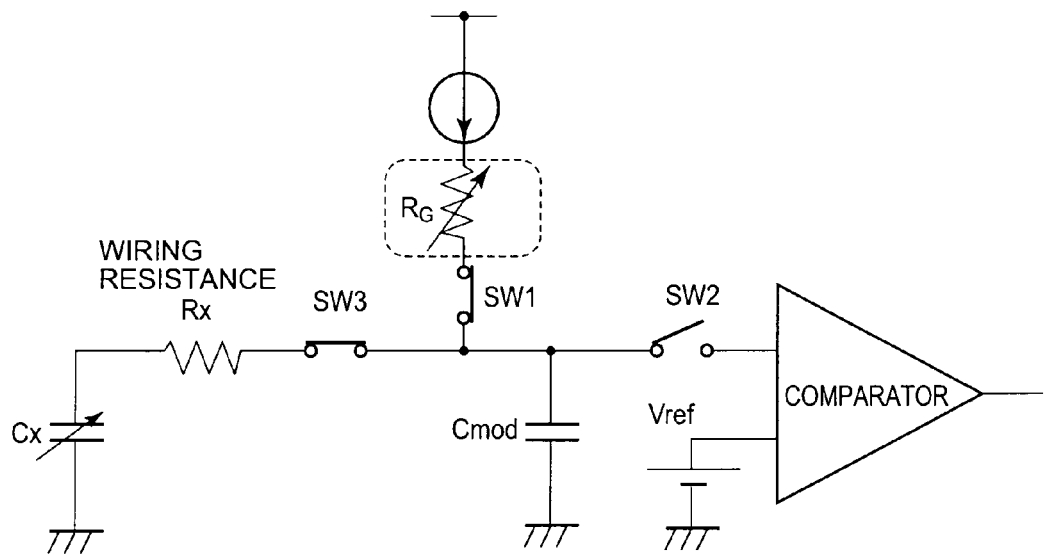
FIG. 16 is a schematic diagram illustrating a typical circuit configuration of the control IC 2.

FIGS. 15 and 16 are schematic diagrams illustrating typical circuit configurations of the control IC 2 that enables the touch panel 1 to switch between a state where Rx<Rs and a state where Rx>Rs. Referring to FIGS. 15 and 16, capacitance Cx, which is generated by a finger and an ITO electrode, and wiring resistance Rx are parameters determined outside the control IC.

For example, a switching circuit may be incorporated as shown in FIG. 15 to switch between a route that involves an internal resistance within a sensor terminal of the control IC 2 and a route that involves no such internal resistance. Further, when, for instance, the employed configuration uses a constant current source as a power source that gives a capacitance change to a sensor electrode, the configuration may include a circuit that has a mechanism for limiting the current flowing from the constant current source with a variable resistor and a transistor.

In the example shown in FIG. 15, a resistor $R_G$ and a changeover switch SW4 are incorporated into the control IC in addition to the circuit configuration shown in FIG. 2. When the ghost elimination sequence is to be performed, a state where $Rx'=Rx+R_G>Rs$ can be invoked by turning on the changeover switch SW4 instead of the sensor line selector switch SW3 in phase 1.

In the example shown in FIG. 16, a variable resistor $R_G$ is placed between the switch SW1 and the constant current source in addition to the circuit configuration shown in FIG. 2. This makes it possible to control the amount of current flowing while the capacitors Cmod, Cx are charged in phase 1 during the execution of the ghost elimination sequence. Consequently, a state where Rx>Rs can be invoked.

Figure 17:
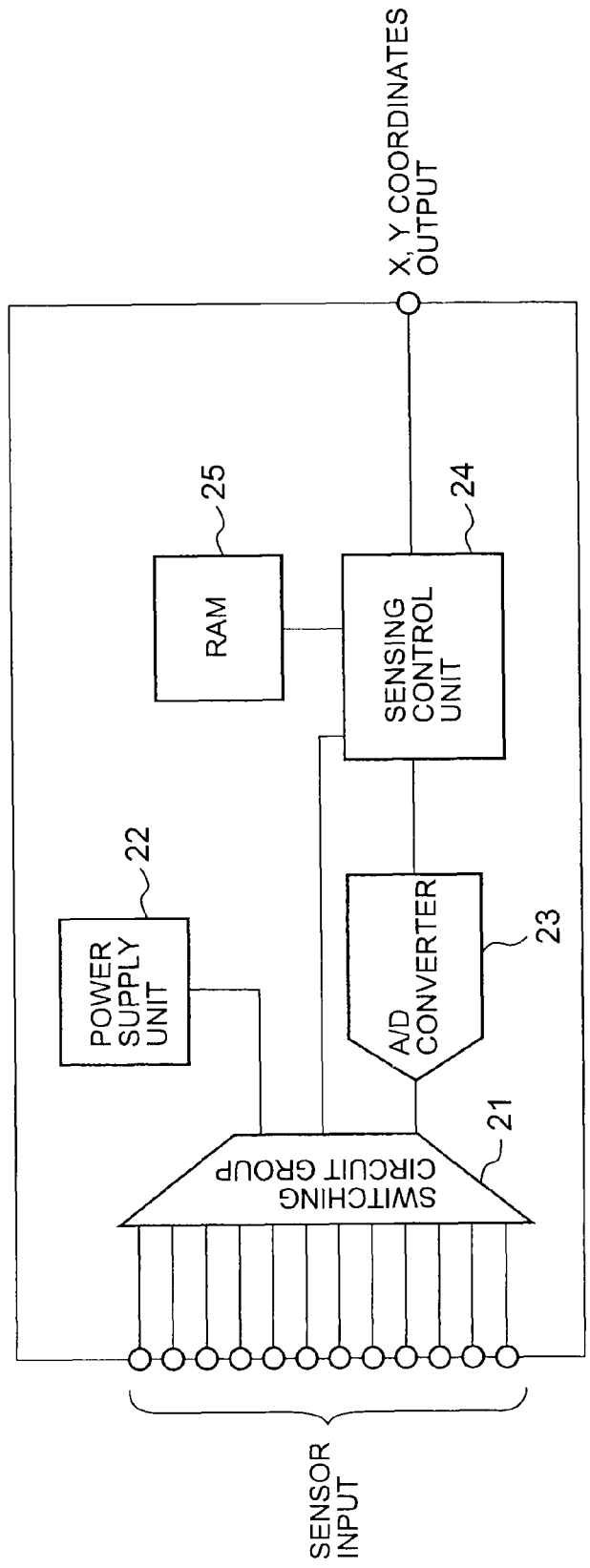
FIG. 17 is a functional block diagram illustrating a typical configuration of the control IC 2.
Figure 18:
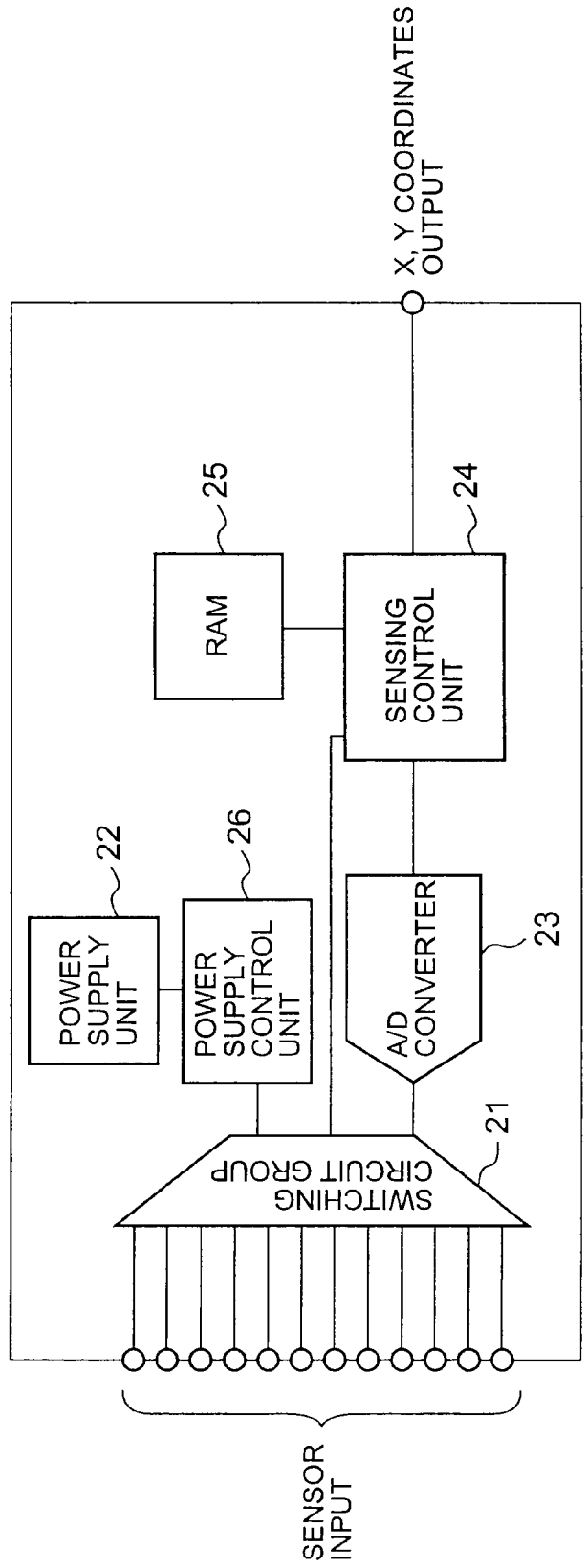
FIG. 18 is a functional block diagram illustrating a typical configuration of the control IC 2.

FIGS. 17 and 18 are functional block diagrams illustrating typical configurations of the control IC 2. FIG. 17 is a block diagram illustrating a typical configuration of the control IC 2 that implements the circuit shown in FIG. 12. As shown in FIG. 17, the control IC 2 may include, for instance, a switching circuit group 21, a power supply unit 22, an A/D converter 23, a sensing control unit 24, and a RAM 25.

In response to control exercised by the sensing control unit 24, the switching circuit group 21 changes the sensor input terminal to be measured. The power supply unit 22 is a power source for capacitor charging.

The A/D converter 23 is a circuit group that compares the voltage of the capacitor Cmod against a reference voltage Vref, converts the difference between the Cmod voltage and Vref voltage to a digital value, and outputs the digital value as a sensor output value. The sensing control unit 24 is a processor unit that controls the execution of a sensing sequence. The sensing control unit 24 outputs various control signals to various functional blocks, executes a sensing sequence to obtain a sensor output value, and determines XY coordinates from the sensor output value. The sensing control unit 24 may incorporate the functionality of a DSP (Digital Signal Processor) for the purpose of calculating the XY coordinates from the sensor output value.

The RAM 25 is a memory that temporarily stores measurement results.

In the present example, the switching circuit group 21 includes the switch SW4 and resistor $R_G$ shown in FIG. 12 in relation to each of the at least one of the X and Y side sensor lines. In response to a control signal from the sensing control unit 24, the switching circuit group 21 switches between a normal scan sequence operation and a ghost elimination sequence operation. When the normal scan sequence is performed, the switching circuit group 21 controls the switch SW3 for sensor line selection purposes. When, on the other hand, the ghost elimination sequence is performed, the switching circuit group 21 allow the detection of sensitivity slope by controlling the switch SW4, instead of the switch SW3, for sensor line selection purposes.

FIG. 18 is a block diagram illustrating a typical configuration of the control IC 2 that implements the circuit shown in FIG. 16. As shown in FIG. 18, the control IC 2 may include, for instance, a switching circuit group 21, a power supply unit 22, an A/D converter 23, a sensing control unit 24, a RAM 25, and a power supply control unit 26.

The power supply control unit 26 is a circuit group that limits the current flowing from the power supply unit 22 with a variable resistor and a transistor. The power supply control unit 26 controls a variable resistor $R_G$ in response to a control signal from the sensing control unit 24 for the purpose of limiting the current to generate a sensitivity slope during the ghost elimination sequence only.

In the present example, the switching circuit group 21 is simply required to have a function necessary for performing the normal scan sequence. In other words, the switching circuit group 21 does not have to include the switch SW4 or resistor $R_G$ shown in FIG. 12. In the other respects, the switching circuit group 21 may be the same as indicated in FIG. 18.

Figure 19:
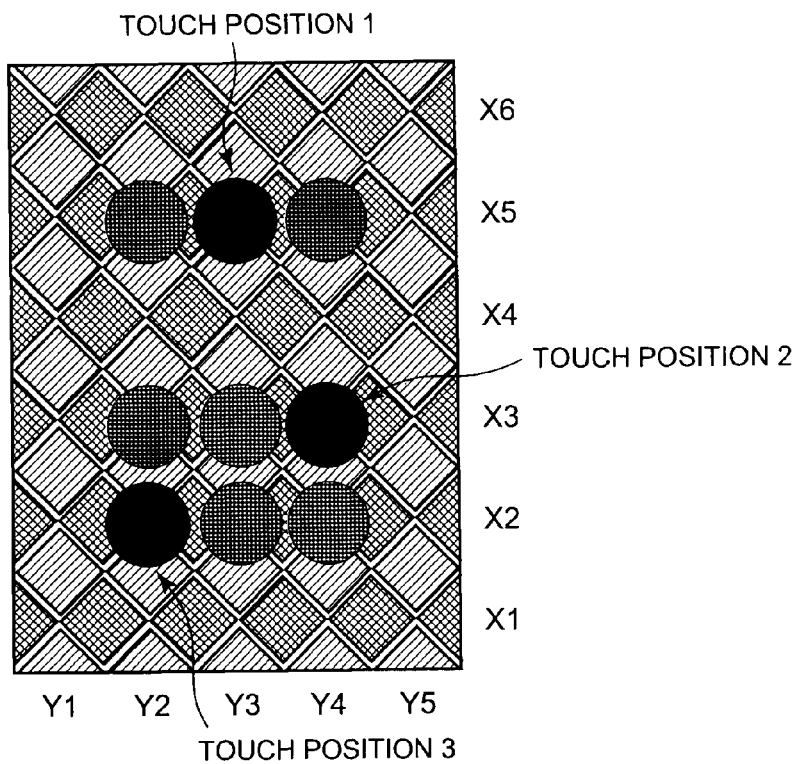
FIG. 19 is a diagram illustrating an example of coordinate detections of three touch points.

FIGS. 19 to 22 are diagrams illustrating an example of coordinate detections of three touch points. When, for instance, three points are touched as shown in FIG. 19, the control IC 2 detects that six terminals, namely, X2, X3, X5, Y2, Y3, and Y4 terminals, are active. In this instance, the control IC 2 should perform ghost elimination setup, for instance, for the Y2, Y3, and Y4 sensor lines and repeat a sensing operation to execute the ghost elimination sequence, as is the case with a two-point touch. Thus, the control IC 2 can compare the sensor output values of the three sensor lines, determine the touch position relationship between the three sensor lines, and identify erroneously detected coordinates.

Figure 20:
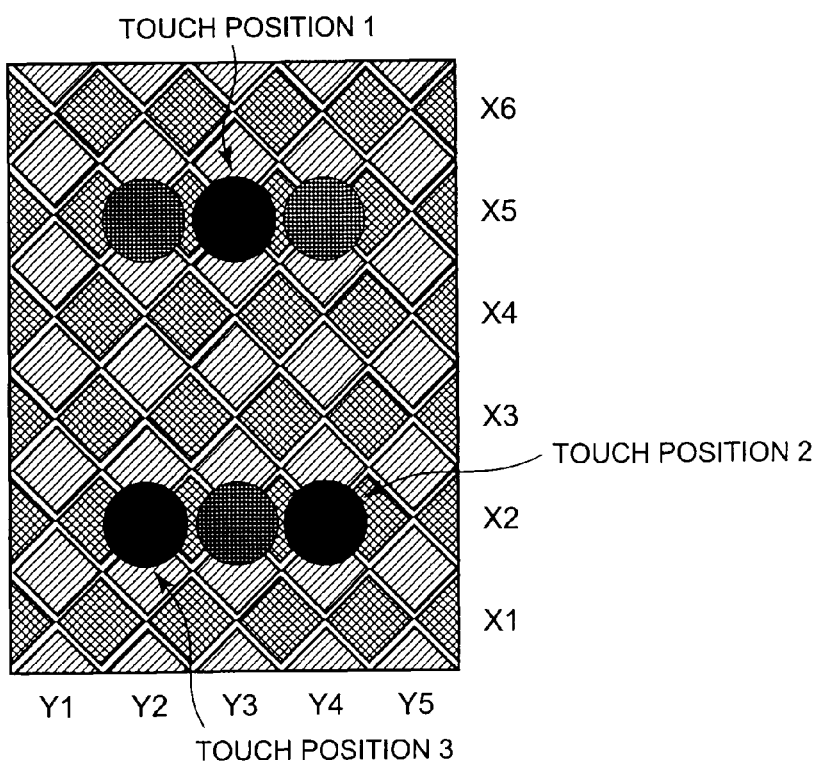
FIG. 20 is a diagram illustrating an example of coordinate detections of three touch points.

When, for instance, three points are touched as shown in FIG. 20, the control IC 2 detects that five terminals, namely, X2, X5, Y2, Y3, and Y4 terminals, are active. In this instance, the control IC 2 should perform ghost elimination setup, for instance, for the Y2, Y3, and Y4 sensor lines and repeat a sensing operation to execute the ghost elimination sequence. Thus, the control IC 2 can compare the sensor output values of the three sensor lines, determine the touch position relationship between the three sensor lines, and identify erroneously detected coordinates. When the above detection is accomplished, it is necessary to perform a ghost elimination sensing operation on either the X side or Y side, whichever has a greater number of active sensor lines (the Y side in the present example).

Figure 21:
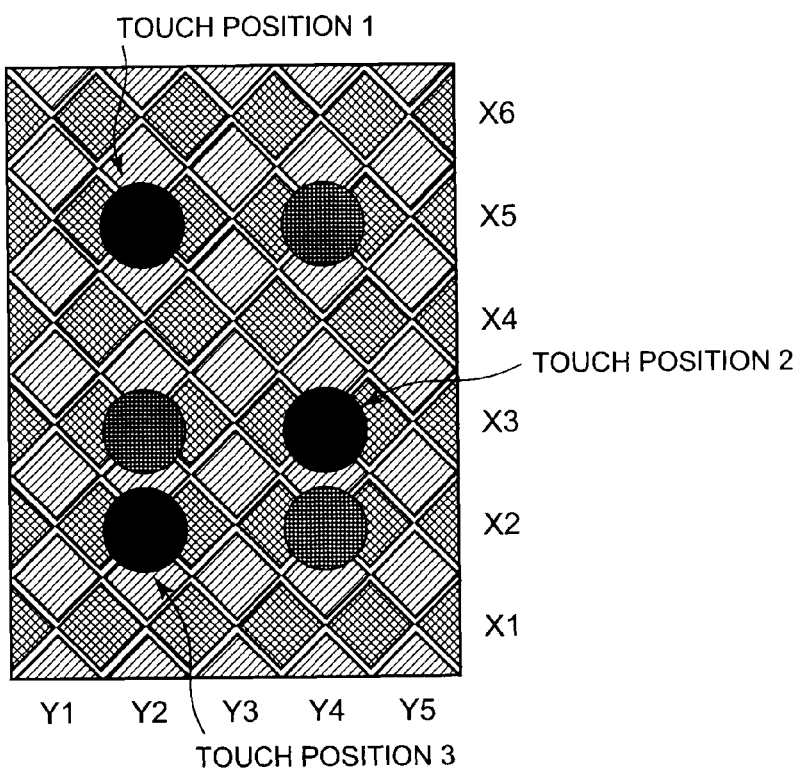
FIG. 21 is a diagram illustrating an example of coordinate detections of three touch points.

When, for instance, three points are touched as shown in FIG. 21, the control IC 2 detects that five terminals, namely, X2, X3, X5, Y2, and Y4 terminals, are active. In this instance, the control IC 2 should perform ghost elimination setup, for instance, for the X2, X3, and X5 sensor lines and repeat a sensing operation to execute the ghost elimination sequence. Then, the control IC 2 should compare the sensor output values of the three sensor lines, determine the touch position relationship between the three sensor lines, and identify erroneously detected coordinates. When the above detection is accomplished, it is necessary to perform a ghost elimination sensing operation on either the X side or Y side, whichever has a greater number of active sensor lines (the X side in the present example).

Figure 22:
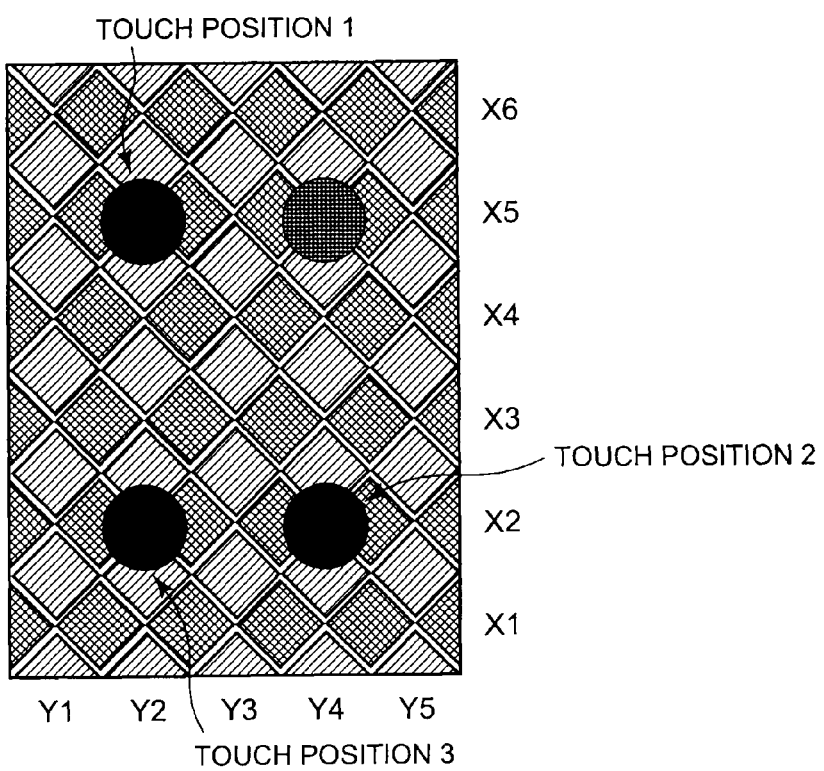
FIG. 22 is a diagram illustrating an example of coordinate detections of three touch points.
Figure 23:
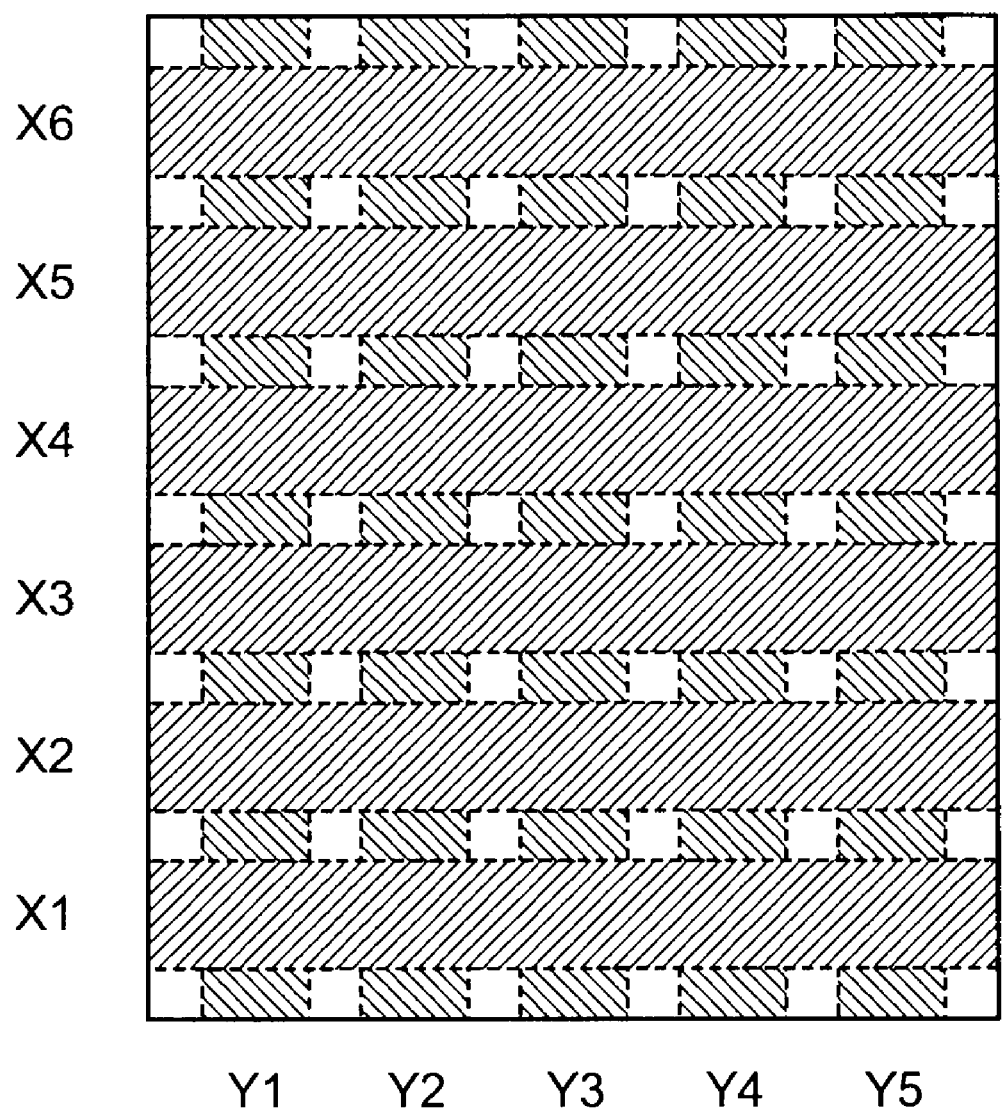
FIG. 23 is a diagram illustrating a typical pattern of electrodes mounted in a touch panel based on the first method.
Figure 24:
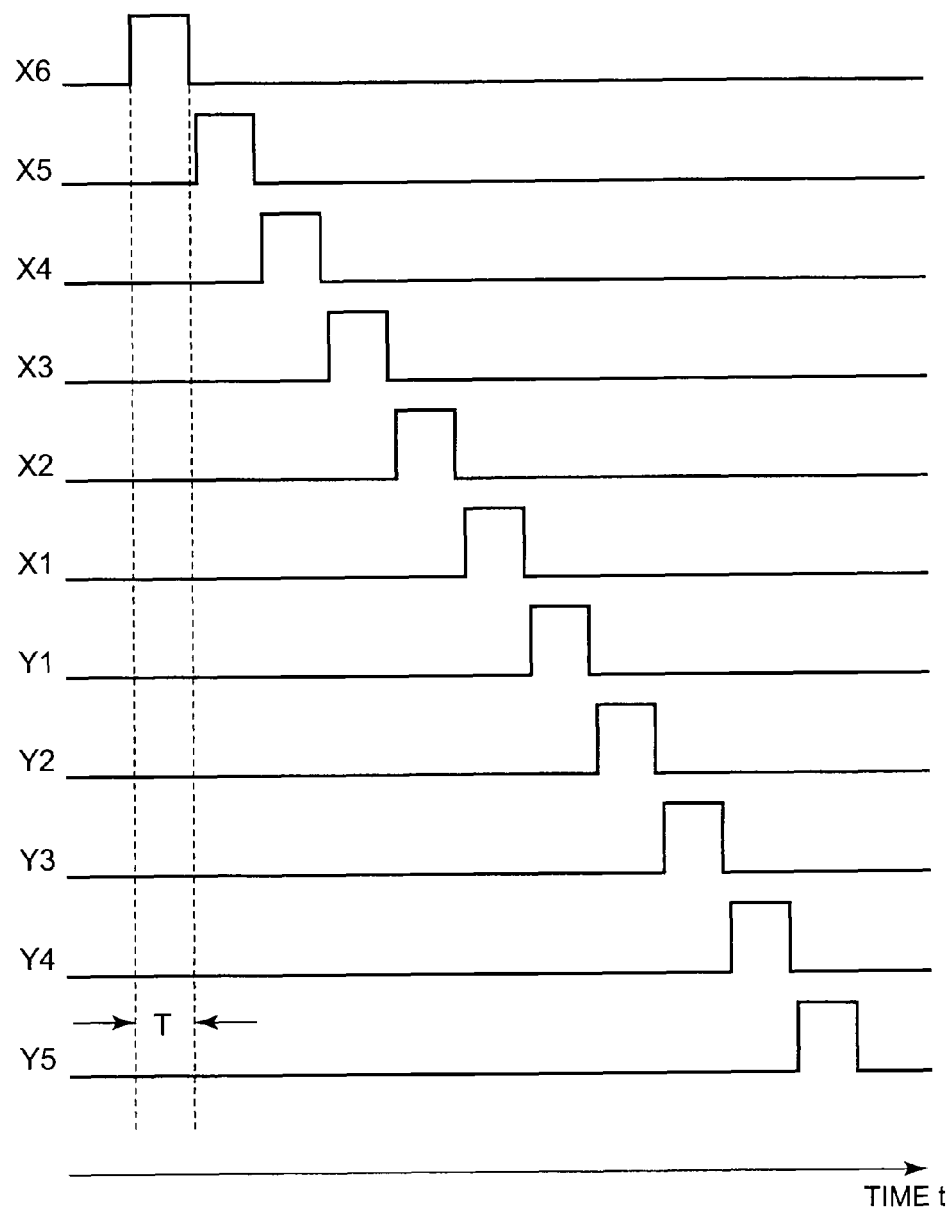
FIG. 24 is a diagram illustrating a typical capacitance measurement sequence of a touch panel based on the first method.
Figure 25:
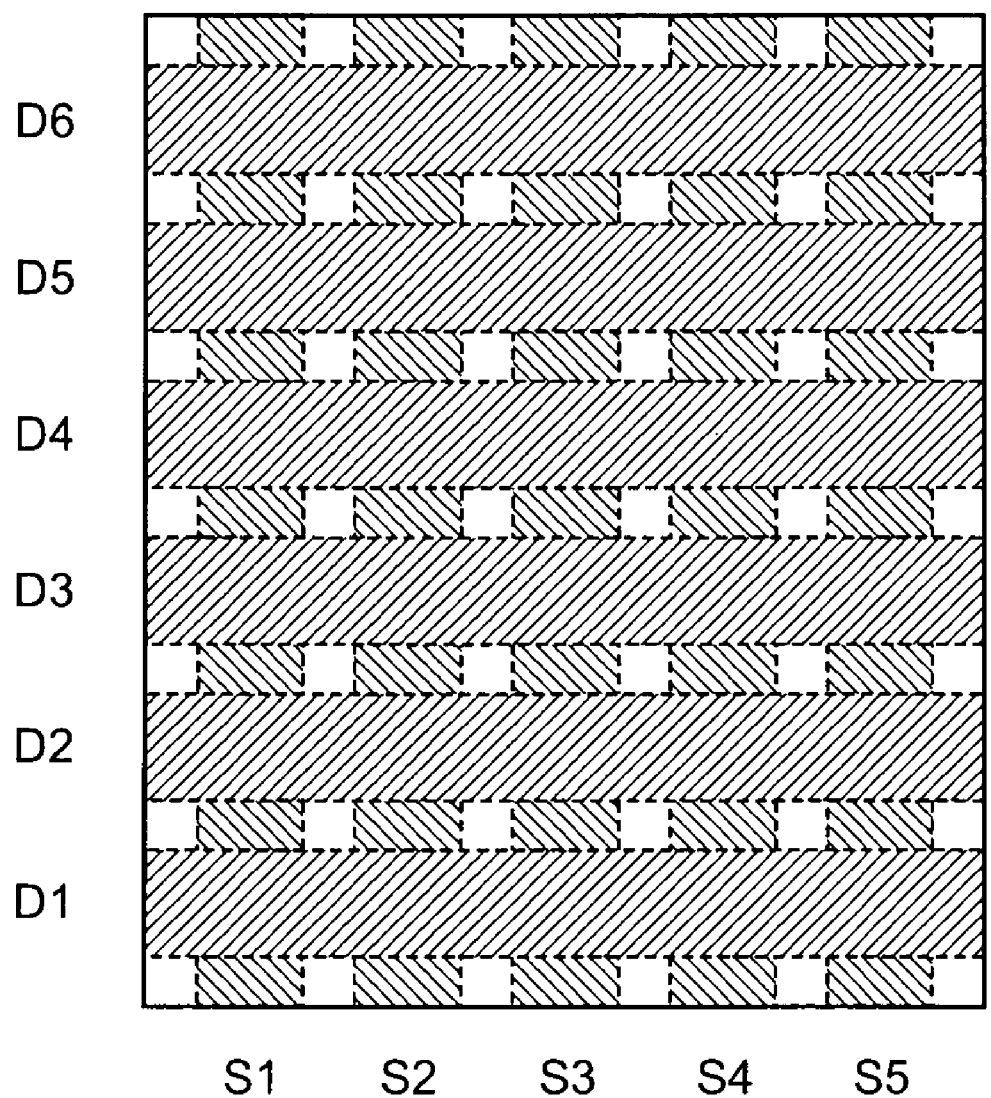
FIG. 25 is a diagram illustrating a typical pattern of electrodes mounted in a touch panel based on a second method.
Figure 26:
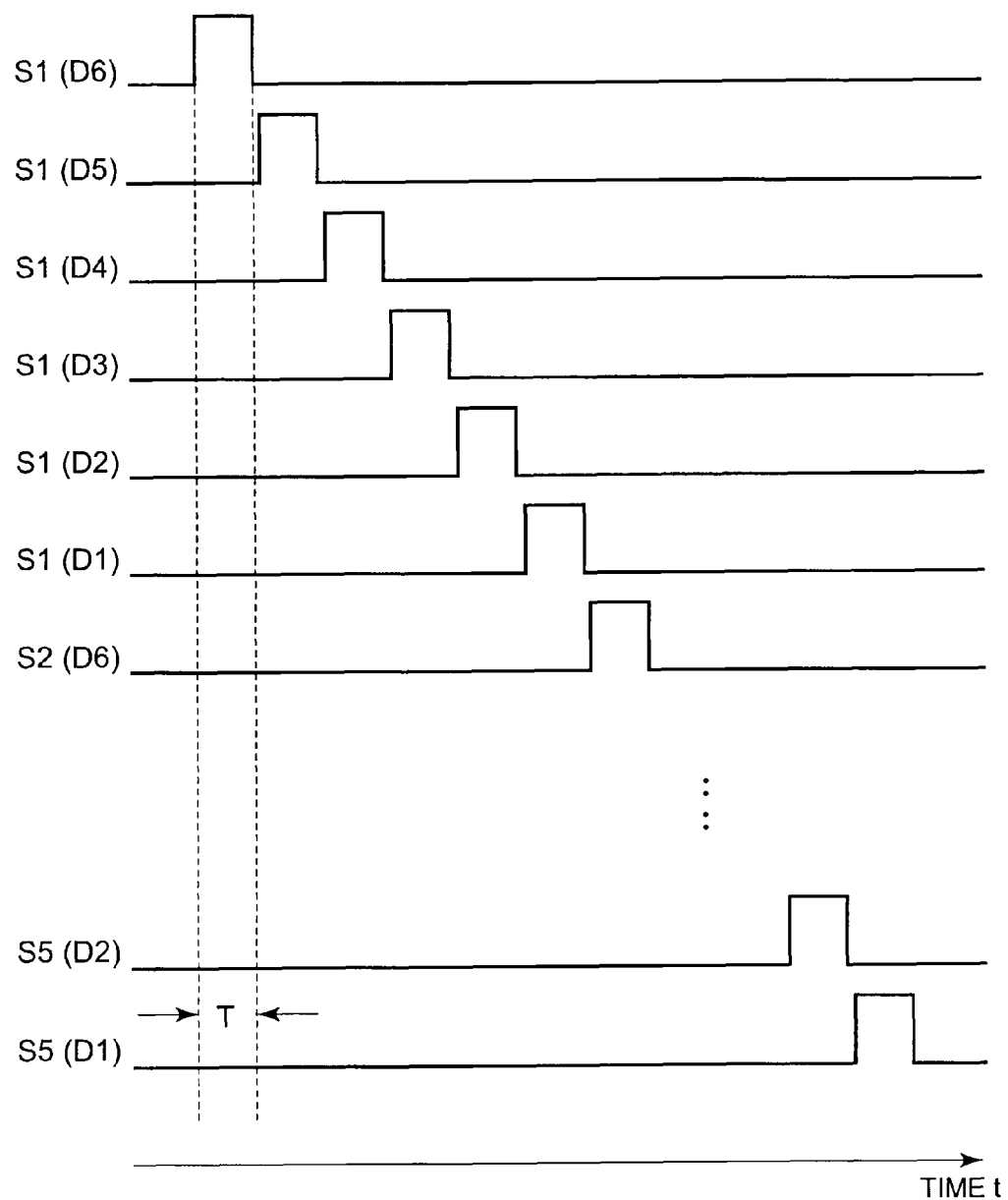
FIG. 26 is a diagram illustrating a typical capacitance measurement sequence of a touch panel based on the second method.

When, for instance, three points are touched as shown in FIG. 22, the control IC 2 detects that four terminals, namely, X2, X5, Y2, and Y4 terminals, are active. In this instance, the control IC 2 recognizes that two points are touched, and fails to recognize a three-point multi-touch.

More specifically, the present exemplary embodiment can avoid a ghost in the case of a two-point multi-touch without regard to its type. In the case of a three-point multi-touch, however, the present exemplary embodiment can not always avoid a ghost (may fail to recognize the three-point multi-touch). In conclusion, the present invention is applicable to a multi-touch of three or more points as far as the number of active sensor electrodes on either the X side or Y side is equal to the number of touch points.

Even when a multi-point touch is detected, it is conceivable that a capacitance difference appropriate for the positional relationship between touch points may not be obtained due, for instance, to an unduly light touch or small finger contact area. This problem can be avoided, for instance, by increasing a sensor on/off judgment threshold value and by refraining from identifying the coordinates of two points if the sensor output value difference between the associated two sensors is insufficient.

As described above, the present exemplary embodiment makes it possible to provide a capacitive touch panel device that is capable of detecting multi-touches and minimizing the increase in the response time without sacrificing the advantages of the first method. When, for instance, a touch panel formed by 6×5 sensor lines is used, the scan time required for the detection of multi-touches is always 30 T during the use of the second method. However, the present invention requires a scan time of as short as 11 T when no multi-point touch is encountered. Even when a multi-point touch is encountered, the present invention requires a scan time of no longer than 16 T because it needs to perform a scan of up to five additional sensor lines. Even in a situation where the ghost elimination sequence is performed on all sensor lines on both sides for enhanced accuracy, the present invention requires a scan time of 22 T. It means that the response time of the present invention is still shorter than that of the second method.

According to the present invention, it is possible to provide a capacitive touch panel device that is capable of detecting multi-touches while minimizing the increase in the response time.

The present invention is applicable to a capacitive touch panel that is designed to detect a simultaneous touch of two or more points.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A capacitive touch panel device comprising:
a capacitive touch panel which has sensor electrodes arranged in the x and y directions; and
a sensing control unit which controls the execution of a scan sequence to measure a sensor output value that is obtained by quantifying a change in the capacitance generated between the sensor electrode mounted in the capacitive touch panel and a conductive body positioned close to the sensor electrode;
wherein, the sensing control unit exercises control to:
measure sensor output values, with setup performed to avoid the detection of sensitivity slope, by executing a first scan sequence on all the sensor electrodes mounted in the capacitive touch panel,
if the result of the first scan sequence indicates that multiple points are touched, measure sensor output values again, with setup performed to allow the detection of sensitivity slope, by executing a second scan sequence on the sensor electrodes related to a plurality of touch position candidate coordinates derived from the multiple point touches, and
identify and eliminate erroneously detected coordinates in accordance with the sensor output values measured upon the execution of the second scan sequence and with the tendency of sensitivity slope.

2. The capacitive touch panel device according to claim 1, wherein, when multiple points are found to be touched, the sensing control unit exercises control to perform setup to allow the detection of sensitivity slope, measure sensor output values again by executing the second scan sequence on the sensor electrodes that are arranged in the at least one of the x direction and the y direction, the sensor electrodes being found to be touched, and identify and eliminate erroneously detected coordinates in accordance with the magnitude relationship between the sensor output values of the sensor electrodes, which are measured upon the execution of the second scan sequence, and with the tendency of sensitivity slope.

3. The capacitive touch panel device according to claim 1, wherein, when multiple points are found to be touched, the sensing control unit exercises control to perform setup to allow the detection of sensitivity slope, measure sensor output values again by executing the second scan sequence on one or more sensor electrodes related to a plurality of touch position candidate coordinates derived from the multiple point touches, and identify and eliminate erroneously detected coordinates in accordance with the magnitude relationship between the sensor output values of the sensor electrodes, which are measured upon the execution of the second scan sequence, and position-specific expected sensor output values of a predetermined sensor electrode and with the tendency of sensitivity slope.

4. The capacitive touch panel device according to claim 1, further comprising:
a switching circuit which is provided in a path connecting the sensor electrodes arranged in the at least one of the x direction and the y direction to a sensing circuit group for measuring sensor output values of destination sensor electrodes, the switching circuit being capable of switching between a route without internal resistance and a route with internal resistance;
wherein, when executing the first scan sequence, the sensing control unit performs setup to avoid the detection of sensitivity slope by causing the switching circuit to select the route without internal resistance; and
wherein, when executing the second scan sequence, the sensing control unit performs setup to allow the detection of sensitivity slope by causing the switching circuit to select the route with internal resistance.

5. The capacitive touch panel device according to claim 2, further comprising:
a switching circuit which is provided in a path connecting the sensor electrodes arranged in the at least one of the x direction and the y direction to a sensing circuit group for measuring sensor output values of destination sensor electrodes, the switching circuit being capable of switching between a route without internal resistance and a route with internal resistance;

wherein, when executing the first scan sequence, the sensing control unit performs setup to avoid the detection of sensitivity slope by causing the switching circuit to select the route without internal resistance; and wherein, when executing the second scan sequence, the sensing control unit performs setup to allow the detection of sensitivity slope by causing the switching circuit to select the route with internal resistance.

6. The capacitive touch panel device according to claim 3, further comprising:

a switching circuit which is provided in a path connecting the sensor electrodes arranged in the at least one of the x direction and the y direction to a sensing circuit group for measuring sensor output values of destination sensor electrodes, the switching circuit being capable of switching between a route without internal resistance and a route with internal resistance;

wherein, when executing the first scan sequence, the sensing control unit performs setup to avoid the detection of sensitivity slope by causing the switching circuit to select the route without internal resistance; and wherein, when executing the second scan sequence, the sensing control unit performs setup to allow the detection of sensitivity slope by causing the switching circuit to select the route with internal resistance.

7. The capacitive touch panel device according to claim 1, further comprising:

a current-limiting circuit which limits the current flowing from a constant current source for applying a capacitance change to a sensor electrode;

wherein, when executing the first scan sequence, the sensing control unit performs setup to avoid the detection of sensitivity slope by exercising control to inhibit the current-limiting circuit from providing current control; and wherein, when executing the second scan sequence, the sensing control unit performs setup to allow the detection of sensitivity slope by exercising control to let the current-limiting circuit provide current control.

8. The capacitive touch panel device according to claim 2, further comprising:

a current-limiting circuit which limits the current flowing from a constant current source for applying a capacitance change to a sensor electrode;

wherein, when executing the first scan sequence, the sensing control unit performs setup to avoid the detection of sensitivity slope by exercising control to inhibit the current-limiting circuit from providing current control; and wherein, when executing the second scan sequence, the sensing control unit performs setup to allow the detection of sensitivity slope by exercising control to let the current-limiting circuit provide current control.

9. The capacitive touch panel device according to claim 3, further comprising:

a current-limiting circuit which limits the current flowing from a constant current source for applying a capacitance change to a sensor electrode;

wherein, when executing the first scan sequence, the sensing control unit performs setup to avoid the detection of sensitivity slope by exercising control to inhibit the current-limiting circuit from providing current control; and wherein, when executing the second scan sequence, the sensing control unit performs setup to allow the detection of sensitivity slope by exercising control to let the current-limiting circuit provide current control.

10. A capacitive touch panel device comprising:

a capacitive touch panel which has sensor electrodes that are arranged in at least one direction; and a sensing control unit which controls the execution of a scan sequence to measure a sensor output value that is obtained by quantifying a change in the capacitance generated between the sensor electrode mounted in the capacitive touch panel and a conductive body positioned close to the sensor electrode;

wherein, the sensing control unit exercises control to perform setup to allow the detection of sensitivity slope, and execute the scan sequence for detecting position coordinates of a sensor electrode where the conductive body positioned close to the sensor electrode.

\* \* \* \* \*